US012103140B2

(12) United States Patent
Vallad

(10) Patent No.: US 12,103,140 B2
(45) Date of Patent: Oct. 1, 2024

(54) STUFFING BOX REBUILD SYSTEMS, APPARATUS, AND METHODS

(71) Applicant: Chad Harold Wesley Vallad, Eaton, CO (US)

(72) Inventor: Chad Harold Wesley Vallad, Eaton, CO (US)

( * ) Notice: Subject to any disclaimer, the term of this patent is extended or adjusted under 35 U.S.C. 154(b) by 357 days.

(21) Appl. No.: 17/703,951

(22) Filed: Mar. 24, 2022

(65) Prior Publication Data

US 2022/0305622 A1 Sep. 29, 2022

Related U.S. Application Data

(60) Provisional application No. 63/165,658, filed on Mar. 24, 2021.

(51) Int. Cl.
*B25B 13/48* (2006.01)
*B25H 1/00* (2006.01)
*B25H 1/04* (2006.01)

(52) U.S. Cl.
CPC ........... *B25B 13/48* (2013.01); *B25H 1/0057* (2013.01); *B25H 1/04* (2013.01)

(58) Field of Classification Search
CPC ........................................................ B25H 1/04
See application file for complete search history.

(56) References Cited

U.S. PATENT DOCUMENTS 1,400,285 A * 12/1921 William .................. B25B 13/08 81/125.1
4,122,956 A * 10/1978 Hargrove ............. B25H 1/0007 211/126.14
5,024,453 A * 6/1991 Suggs ..................... F16K 41/02 277/516
5,232,035 A * 8/1993 Adams, Jr. ............... B25H 3/06 157/14
5,267,748 A * 12/1993 Curran ...................... B60R 9/06 280/415.1
6,511,088 B2 * 1/2003 Kahlstorf ................. B60D 1/52 280/415.1

OTHER PUBLICATIONS

How to Build A Skinner Brothers Stuffing Box, YouTube: youtube.com/watch?v=RhJCFxH2JZ) (Year: 2018).*
Stuffing Box Wrench Set, sold by R.E. Thomas Marine Hardware INc. at retmarine.com (Year: 2022).*
Slickline Stuffing Box Assembly, YouTube: youtube.com/watch?v=1wPiHEOXKv0 (Year: 2017).*
Stuffing Box tear down and replace with new packing. Strip onto the Polish Rod, YouTube: youtube/com/watch?vTiATqx1-JHw (Year: 2023).*

* cited by examiner

*Primary Examiner* — Bryan R Muller
(74) *Attorney, Agent, or Firm* — Mohr Intellectual Property Law Solutions, P.C.

(57) ABSTRACT

Stuffing box rebuild systems including a first socket precision-tooled to couple with a top seat of the stuffing box, a second socket precision-tooled to couple with a bottom seat of the stuffing box, and a rebuild table including one or more receptacles for receiving and retaining the stuffing box during the rebuild. In some examples, the stuffing box rebuild system includes a top wrench precision-tooled to couple with a top seat of the stuffing box and a bottom wrench precision-tooled to couple with a bottom seat of the stuffing box. In some further examples, the top wrench is precision-tooled to couple to the first socket and the bottom wrench is precision-tooled to couple to the second socket.

20 Claims, 18 Drawing Sheets

STUFFING BOX REBUILD SYSTEMS, APPARATUS, AND METHODS

CROSS REFERENCE TO RELATED APPLICATIONS

This application claims priority to U.S. Application, Ser. No. 63/165,658 filed on Mar. 24, 2021, which is hereby incorporated by reference for all purposes.

BACKGROUND

The present disclosure relates generally to systems, apparatus, and methods for rebuilding stuffing boxes. In particular, equipment and tools for dismantling, rebuilding, and reassembling stuffing boxes are described.

Stuffing boxes are an assembly used to house a seal, which prevents leakage of fluid between sliding or turning parts of a machine. Stuffing boxes are commonly used in dynamic control valves or ball valves to provide a seal around a reciprocating rod or shaft rod, such as might be found on a rod pumped oil or gas well.

Known equipment and tools for rebuilding stuffing boxes are not entirely satisfactory for the range of applications in which they are employed. For example, conventional equipment and tools, such as crescent wrenches and vices, are used to dismantle and reassemble stuffing boxes when cleaning and rebuilding the stuffing boxes. However, these tools are standard sizes for conventional uses and not designed specifically for use with stuffing boxes. The stuffing box may be damaged or difficult to grip. As such, a user may be injured by using these conventional equipment and tools on the stuffing box and its components as they cannot firmly grip the components of the stuffing box for dismantling and reassembly.

Moreover, stuffing boxes may need to be serviced at the site of the machinery in which it is located, necessitating dismantling and reassembly of the stuffing box to be done on site. This may result in working on the stuffing box outside, in the elements, or without even conventional tools or a stable work surface on which to rebuild the stuffing box. This further increases the chances of user injury or damage to the stuffing box.

Thus, there exists a need for a stuffing box rebuild system that improves upon and advances the design of known systems. Examples of new and useful equipment and tools relevant to the needs existing in the field are discussed below.

SUMMARY

The present disclosure is directed to stuffing box rebuild systems including a first socket precision-tooled to couple with a top seat of the stuffing box, a second socket precision-tooled to couple with a bottom seat of the stuffing box, and a rebuild table including one or more receptacles for receiving and retaining the stuffing box during the rebuild. In some examples, the stuffing box rebuild system includes a top wrench precision-tooled to couple with a top seat of the stuffing box and a bottom wrench precision-tooled to couple with a bottom seat of the stuffing box. In some further examples, the top wrench is precision-tooled to couple to the first socket and the bottom wrench is precision-tooled to couple to the second socket.

DETAILED DESCRIPTION

Figure 1:
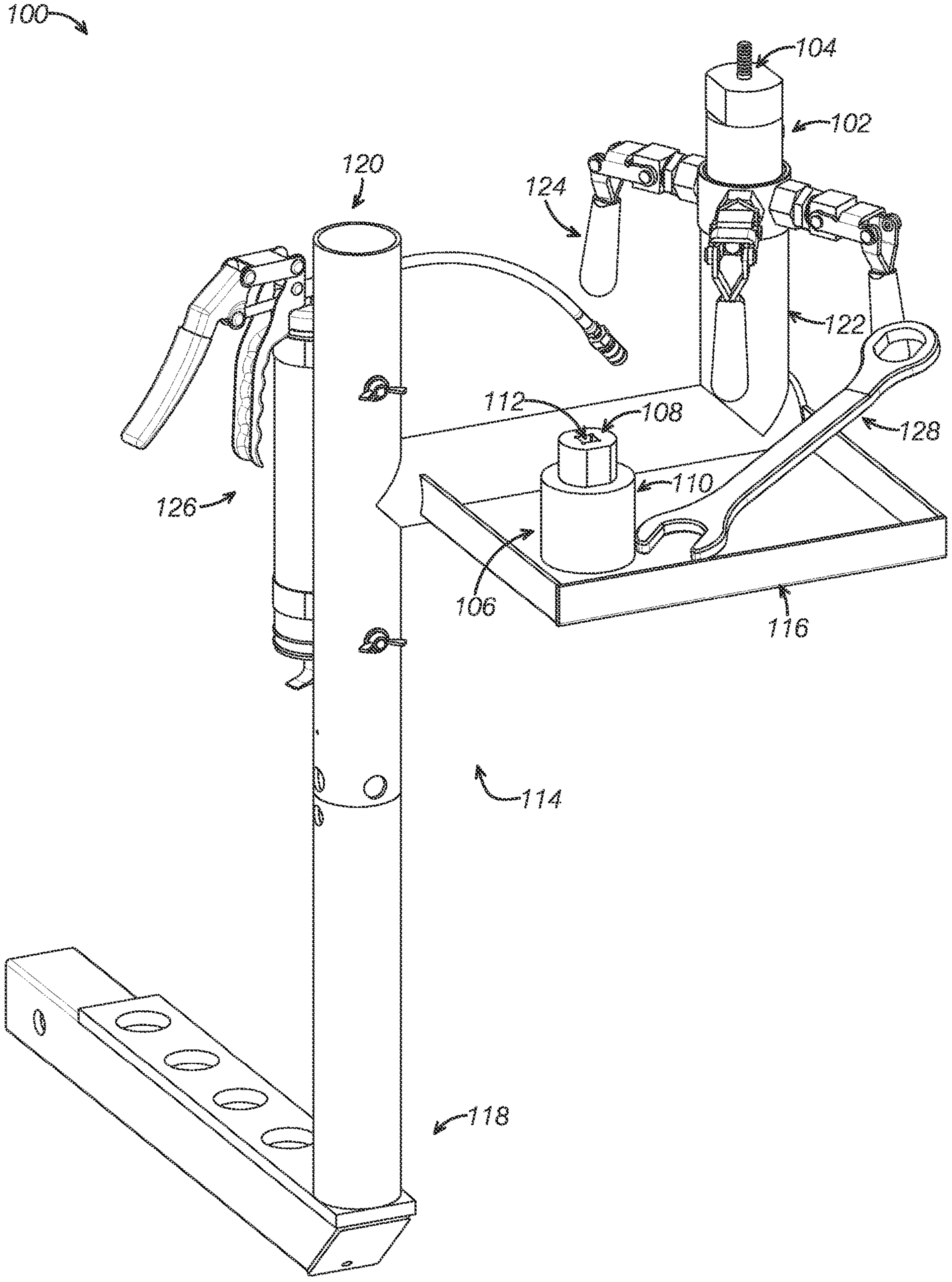
FIG. 1 is a perspective view of a stuffing box rebuild system.

The disclosed stuffing box rebuild systems, apparatus, and methods will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various stuffing box rebuild systems, apparatus, and methods are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device exchanges information with another electronic device, either wirelessly or with a wire-based connector, whether directly or indirectly through a communication network.

"Controllably coupled" means that an electronic device controls operation of another electronic device.

"Precision-tooled" means that a first component is designed, configured, and manufactured to couple to a second, specific component. For example, certain dimensions and measurements of the second component are used to design, configure, and manufacture the first component to create an exact and accurate coupling between the first and second component.

Terms such as "precisely", "precision", and "precise" are used to identify parts or usages of a precision-tooled component to convey the exact and accurate nature of the parts or usages in relation to the other component for which the precision-tooled component is made.

Stuffing Box Rebuild Systems, Apparatus, and Methods

With reference to the figures, Stuffing Box Rebuild Systems, Apparatus, and Methods will now be described. The equipment, tools, and methods discussed herein function to disassemble and reassemble, or rebuild, stuffing boxes in a safe and efficient manner.

The reader will appreciate from the figures and description below that the presently disclosed systems, apparatus, and methods address many of the shortcomings of conventional equipment, tools, and methods for rebuilding stuffing boxes. For example, disassembling and reassembling stuffing boxes, also known as rebuilding, is often done at the site where the stuffing box is located within machinery, such as within a valve used in the oil and gas industry. As such, there is not a sufficient space to rebuild the stuffing box on site. Moreover, standard tools such as open-end wrenches, combo wrenches, socket wrenches, clamps, and vice grips are not designed to fit the stuffing boxes.

Standard stuffing boxes generally include a top seat, a cage, and a bottom seat. The top seat and bottom seat include seating flats for orientation and seating within a mechanism. In a conventional rebuild of a stuffing box, standard tools are used to engage with these seating flats to remove the seats from the stuffing box to inspect, clean, repair, etc. the stuffing box Because these standard tools are not designed to fit these seating flats nor any part of the stuffing box, the standard tools do not properly couple with the seating flats, or other portions of the stuffing box, causing injury to the user and/or damage to the stuffing box when the tools slip or fall off during the rebuild.

In addition, multiple standard sized tools are necessary to attempt to couple with the stuffing boxes and their components. Too many tools clutter the work area when trying to rebuild the stuffing box and may interfere with a timely and safe rebuild. With many sizes of stuffing boxes, no standard size tool may be available to rebuild the stuffing box on site. This necessitates taking the stuffing box away from the work site to a location containing more options of standard tools. This creates a delay in rebuilding the stuffing box causing loss of production time and money due to the shutdown.

Stuffing Box Rebuild System

With reference to FIG. 1, an example of a stuffing box rebuild system 100 will now be described. The stuffing box rebuild system 100 includes a stuffing box 102, a socket 106, and a rebuild table 114. The stuffing box 102 is any conventional stuffing box, such as shown in FIG. 1. The stuffing box 102 includes a top seat 104, a bottom seat (shown in FIG. 2A), and a cage (shown in FIG. 2A). The socket 106 includes a socket top 108 and a socket body 110. The socket top 108 includes a drive socket 112. The rebuild table 114 includes a work surface 116, a base 118, a first respectable 120, and a second receptacle 122. The second receptacle 122 includes one or more clamps 124. As shown in FIG. 1, the work surface may be a tray to keep tools and other items contained on the work surface.

In other examples, the stuffing box rebuild system 100 includes additional or alternative features, such as a wrench 128 precision-tooled for the socket 106 or a grease gun 126 coupled to the rebuild table 114.

Stuffing Box

Figure 2A:
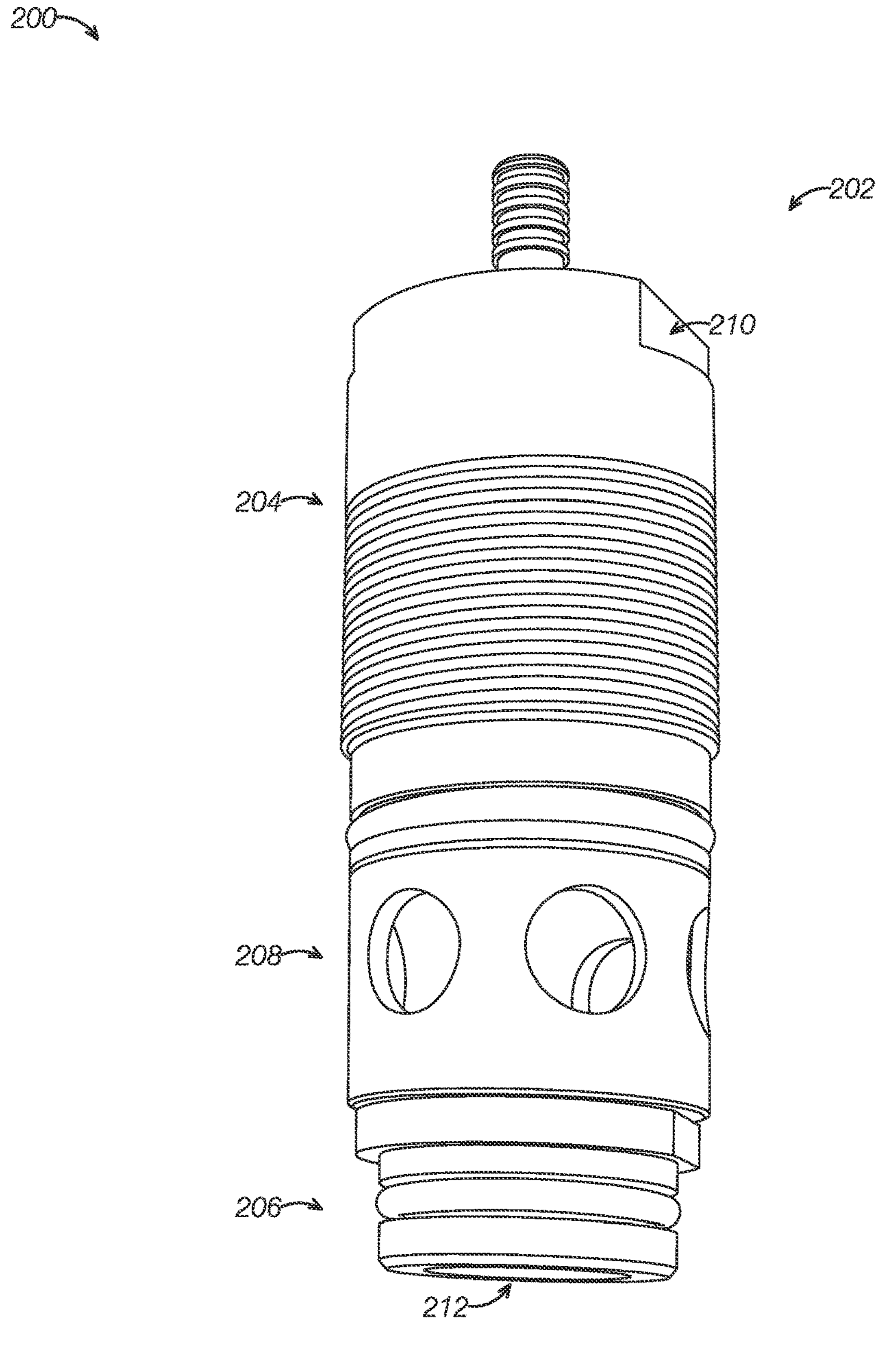
FIG. 2A is a perspective view of a stuffing box.
Figure 2B:
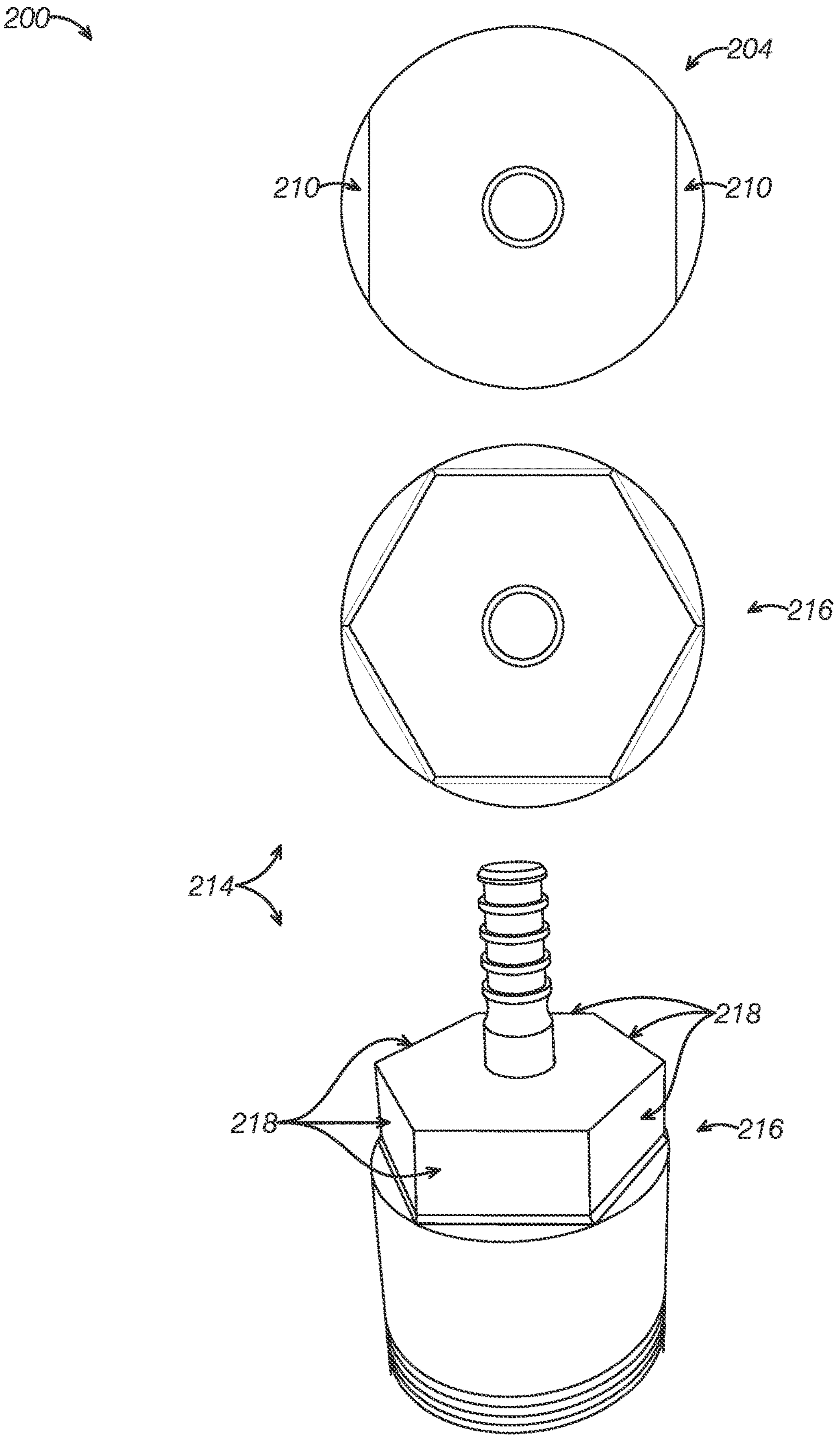
FIG. 2B is a set of top views and a perspective view of stuffing boxes.

For illustrative purposes, examples of a standard, two (2) inch stuffing box are shown in FIG. 1, FIG. 2A, and FIG. 2B. The stuffing box 102, 202 includes a top seat 104, 204, a bottom seat 206, and a cage 208. The top seat 104, 204 includes one or more top seating flats 210 for orientation and seating within a mechanism, such as a valve (not shown). Similarly, the bottom seat 206 includes one or more bottom seating flats 212 for orientation and seating within a mechanism, such as the valve. For many standard stuffing boxes, the cage 208 rotatably couples to the top seat 104, 204 and the bottom seat 206 through a threaded connection.

As shown in FIG. 1 and FIG. 2A, the top seat 104, 204 comprises two top seating flats 210 on opposite sides of the top seat 104, 204. In other stuffing boxes 214, as shown in the middle and bottom drawings in FIG. 2B, the top seat 216 comprises six top seating flats 218 which form a hexagonal shape. Other shapes and configurations of the top seating flats 210, 218 may also be used by stuffing box manufacturers. The bottom seat 206 may similarly comprise two bottom seating flats 212 on opposite sides of the bottom seat 206. Other shapes and configurations of the bottom seating flats 212 may also be used by stuffing box manufacturers.

Sockets

The sockets of the present invention, such as those illustrated in FIG. 1 and FIGS. 3A-3D, are designed and precision-tooled to precisely couple with standard stuffing boxes, such as those illustrated in FIG. 1, FIG. 2A, and FIG. 2B. The sockets resemble standard tool sockets whereby they comprise a top configured to couple to a leverage mechanism for rotating the socket and a body comprising a cavity, whereby the cavity opens at the bottom of the socket for coupling with a tool device. The sockets may be comprised of a variety of materials, such as hardened steel, or other suitable material.

Figure 3A:
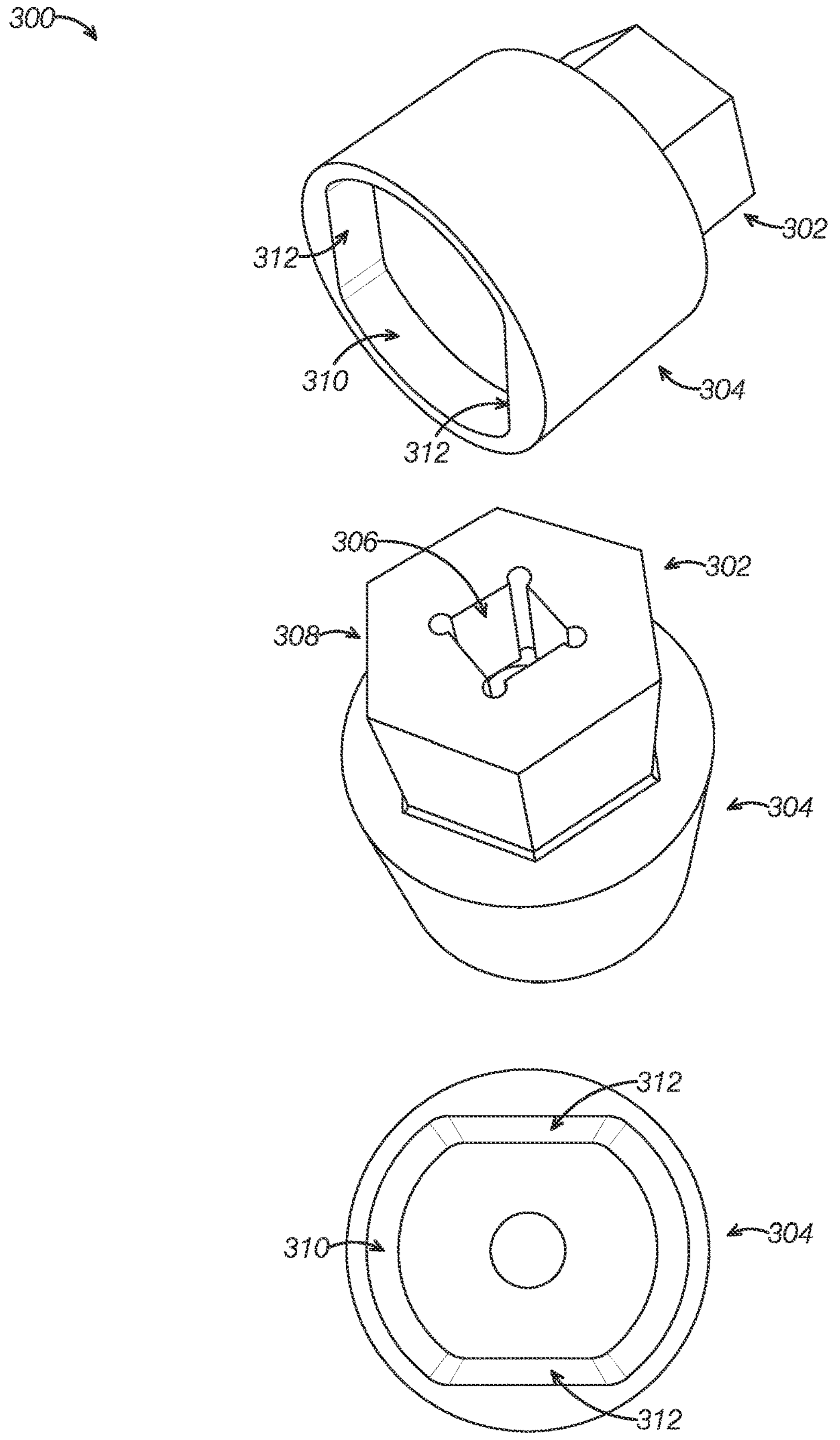
FIG. 3A is a top, perspective, and bottom view of a first example of a socket.

Turning attention to FIG. 3A, socket 300 comprises a socket top 302 and a socket body 304. The socket top 302 comprises a mechanism to couple with a leverage-type tool, such as a wrench, ratchet wrench, etc., to facilitate rotation of the socket 300. This mechanism may be a drive socket 306 in the center of the socket top 302, as shown in FIGS. 3A-3D. In some embodiments, the shape of the socket top 302 is in the shape of a nut 308. In some examples, as shown in FIGS. 3A-3D, the socket top 302 includes both the nut shape 308 and the drive socket 306. In some examples when the only mechanism is the drive socket 306, the shape of the socket top 302 may be a smooth circular cylinder, or an oval cylinder, or other shape.

The socket body 304 comprises an interior cavity wall 310 and one or more stuffing box seating flats 312. The one or more stuffing box seating flats 312 couple to the one or more top seating flats 210 of the top seat 204, or the one or more bottom seating flats 212 of the bottom seat 206, of the stuffing box 202. Once the socket body 304 is coupled to the one or more top seating flats 210 or the one or more bottom seating flats 212, the socket 300 is rotated to loosen the top seat 204 (or bottom seat 206) for removal from the stuffing box 202 and then to retighten the seats 204, 206 once they are replaced back on the stuffing box 202. The socket 300 may also be used to remove and replace the cage 208 of the stuffing box 202.

Figure 3B:
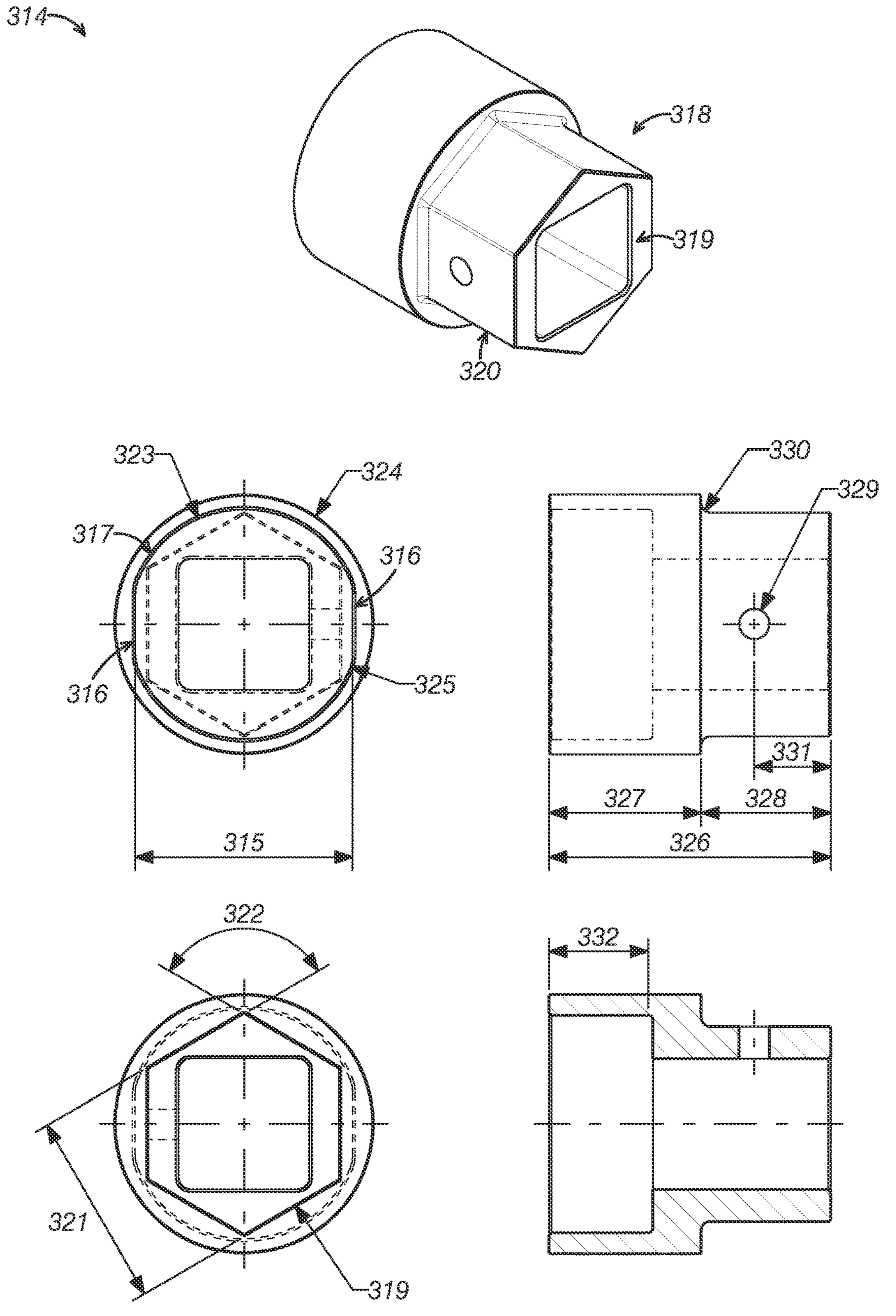
FIG. 3B is a set of perspective views of a second example of a socket.

Turning attention to FIG. 3B, socket 314 is configured to couple to a two (2) inch stuffing box, similar to the stuffing box 202 shown in FIG. 2A. Socket 314 is precision-tooled to couple with the top seat 204 of stuffing box 202. To achieve precision coupling to the two (2) inch stuffing box 202, the socket 314 includes the following measurements: socket interior wall width 315 measures 1.675 inches (with a tolerance of +0.005, −0.000), as measured between socket seating flats 316; and socket interior wall radius 323 measures R.885 inches (with a tolerance of +0.005, −0.000), as measured from center of the socket 314 to socket interior wall 317. These dimensions of socket 314 precisely couple with the top seat 204 of the stuffing box 202. In the example shown in FIG. 3B, two socket seating flats 316 are shown on opposites sides of the socket interior wall 317 to correspond with the two top seating flats 210 of the top seat 204. Other numbers, sizes, and orientations of socket seating flats 316 may be used, depending on the manufacturer's design of the top seat 204. One such example is stuffing box 214, as shown in the middle and bottom drawings in FIG. 2B, which includes six (6) top seating flats 218 in a hexagonal shape on the top seat 216. For this configuration of top seat 216, the corresponding socket, as shown in more detail in FIG. 3D, would comprise six (6) socket seating flats in a corresponding hexagonal shape, precision-tooled to couple precisely with the hexagonal top seat 216.

Socket 314 is shown with two mechanisms on socket top 318 to couple with a leverage-type tool to facilitate rotation of the socket 314. Drive socket 319 couples with a drive square of a standard ratchet wrench. Nut 320 is configured to couple with a wrench, such as an open-end wrench. In some examples, the nut 320 is precision-tooled to couple with the same precision-tooled wrench of the present invention (see discussion below with regard to FIGS. 4A-4D) which couples with the top seat 204. This reduces the number of tools for rebuilding the stuffing box when one wrench can be used on the socket top of the socket precision-tooled for the top seat and the top seat alone. In other examples, the nut 320 is configured to couple to standard sized wrenches, such as open-end wrenches, box end wrenches, combination wrenches, socket wrenches, and ratchet wrenches.

For the example shown in FIG. 3B, the drive socket 319 is a 1.000 inch square per ASA B5.38 and the nut 320 includes a width across flats 321 equal to 1.500 inches (with a tolerance of +/−0.005) and an exterior flat angle 322 equal to 120.00° TYP (with a tolerance of +/−1°). Other sizes of drive socket 319 may be used to work with the corresponding size of ratchet wrench. For example, drive socket 319 may be a ½ inch square, ¼ inch square, a ¾ inch square, or a ⅜ inch square.

The drawings in FIG. 3B are shown in a 1:1 scale. Additional dimensions of socket 314 may include outer socket 324=Ø2.000, socket seating flat 325=R.250 MAX (4×), total socket height 326=2.17, socket base 327=1.17, socket top 328=1.00, socket top hole 329=Ø.234, socket stepped collar 330=R.06 TYP, center of hole to top of socket 331=0.590, and interior socket body height 332=0.764. Unless otherwise specified, the preceding dimensions are in inches. The preceding dimensions may include the following tolerances: angular+/−1°, fractional+/−1⁄16, one place decimal+/−0.050, two place decimal+/−0.01, and three place decimal+/−0.005. Interpretations of the geometric tolerancing is per AMSE Y14.5.

In some examples, socket 314 is precision-tooled to couple with the bottom seat of a two (2) inch stuffing box, such as shown in FIG. 2A. To achieve precision coupling to the two (2) inch stuffing box 202, the socket 314 includes the following measurements: socket interior wall width 315 measures 1.695 inches (with a tolerance of +0.005, −0.000), as measured between the socket seating flats 316; and socket interior wall radius 323 measures R1.050 inches (with a tolerance of +0.005, −0.000), as measured from center of the socket 314 to socket interior wall 317. These dimensions of socket 314 precisely couple with the bottom seat 206 of the stuffing box 202. Similar to socket 314 precision-tooled for the top seat 204 of stuffing box 202, the size, configuration, and number of socket seating flats 316 for a socket 314 precision-tooled for the bottom seat 206 correspond to the size, configuration, and number of bottom seating flats 212 of the bottom seat 206.

Figure 3C:
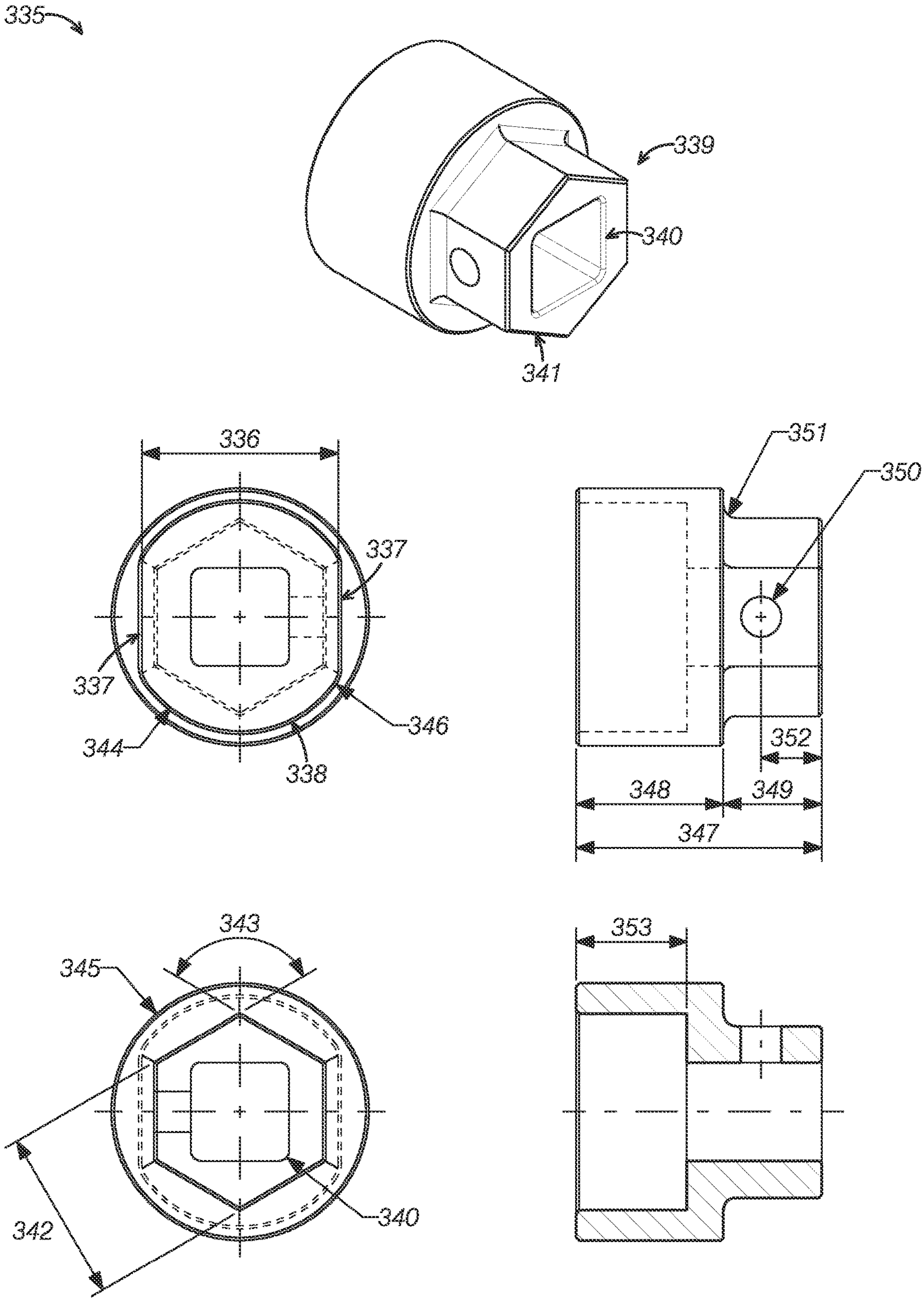
FIG. 3C is a set of perspective views of a third example of a socket.

Turning attention to FIG. 3C, socket 335 is configured to couple to a one (1) inch stuffing box. Socket 335 is precision-tooled to couple with a top seat of the one (1) inch stuffing box. To achieve precision coupling to the one (1) inch stuffing box, the socket 335 includes the following measurements: socket interior cavity wall width 336 measures 1.003 inches (with a tolerance of +0.005, −0.000), as measured between socket seating flats 337; and socket interior wall radius 344 measures R.583 inches (with a tolerance of +0.005, −0.000), as measured from center of the socket 335 to socket interior wall 338. These dimensions of socket 335 precisely couple with the top seat of the one (1) inch stuffing box. In the example shown in FIG. 3C, two socket seating flats 337 are shown on opposites sides of the socket interior wall 338 to correspond with two top seating flats of the top seat of the one (1) inch stuffing box. Other numbers, sizes, and orientations of the socket seating flats 337 may be used, depending on the manufacturer's design of the top seat.

Socket 335 is shown with two mechanisms on socket top 339 to couple with a leverage-type tool to facilitate rotation of the socket 335. Drive socket 340 couples with a drive square of a standard ratchet wrench. Nut 341 is configured to couple with a wrench, such as an open-end wrench. In some examples, the nut 341 is precision-tooled to couple with the same precision-tooled wrench of the present invention (see discussion below with regard to FIGS. 4A-4D) which couples with the top seat 204. This reduces the number of tools for rebuilding the stuffing box when one wrench can be used on the socket top of the socket precision-tooled for the top seat and the top seat alone. In other examples, the nut 341 is configured to couple to standard sized wrenches, such as open-end wrenches, box end wrenches, combination wrenches, socket wrenches, and ratchet wrenches.

For the example shown in FIG. 3C, drive socket 340 is a 0.500 inch square per ASA B5.38 and nut 341 includes a width across flats 342 equal to 0.875 inches (with a tolerance of +/−0.005), and an exterior flat angle 343 equal to 120.00° TYP (with a tolerance of +/−1°). Other sizes of drive socket 340 may be used to work with the corresponding size of ratchet wrench. For example, drive socket 340 may be ¼ inch square, a ¾ inch square, or a ⅜ inch square.

The drawings in FIG. 3C are shown in a 1.5:1 scale. Additional dimensions of socket 335 may include socket outer ring 345=01.131, socket seating flat 346=R.125 MAX (4×), total socket height 347=1.25, socket base 348=0.75, socket top 349=0.50, socket top hole 350=Ø.206, socket stepped collar 351=R.06 TYP, center of hole to top of socket 352=0.309, and interior socket body height 353=0.565. Unless otherwise specified, the preceding dimensions are in inches. The preceding dimensions may include the following tolerances: angular+/−1°, fractional+/−1⁄16, one place decimal+/−0.050, two place decimal+/−0.01, and three place decimal+/−0.005. Interpretations of the geometric tolerancing is per AMSE Y14.5.

In some examples, socket 335 is precision-tooled to couple with the bottom seat of a one (1) inch stuffing box. To achieve precision coupling to the one (1) inch stuffing box, the socket 335 includes the following measurements: socket interior wall width 336 measures 1.187 inches (with a tolerance of +0.005, −0.000), as measured between the socket seating flats 337; and socket interior wall radius 344 measures R.700 inches (with a tolerance of +0.005, −0.000), as measured from center of the socket 335 to socket interior wall 338. These dimensions of socket 335 precisely couple with the bottom seat of the one (1) inch stuffing box. Similar to socket 335 precision-tooled for the top seat of the one (1) inch stuffing box, the size, configuration, and number of socket seating flats 337 for a socket 335 precision-tooled for the bottom seat correspond to the size, configuration, and number of bottom seating flats of the bottom seat.

Figure 3D:
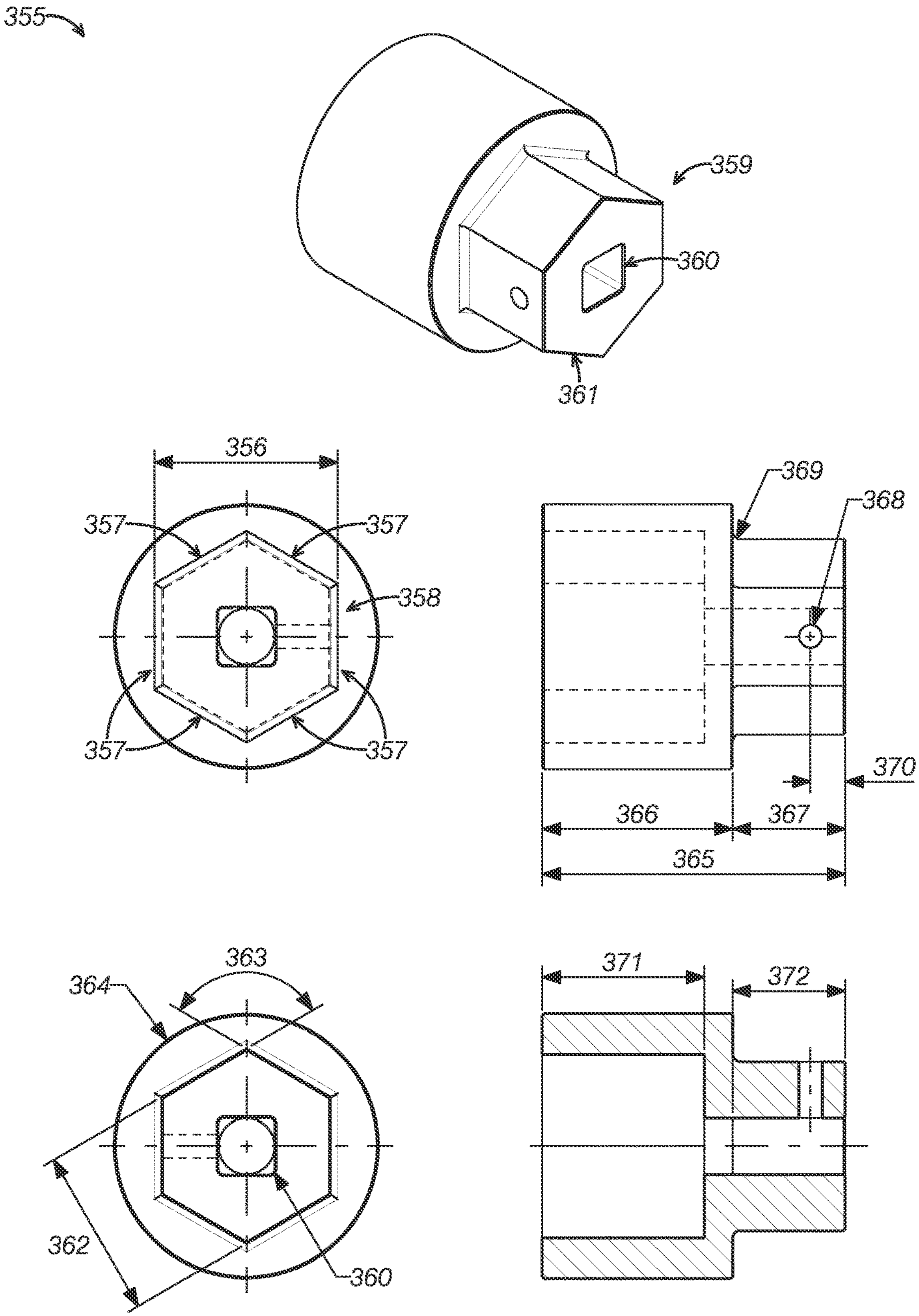
FIG. 3D is a set of perspective views of a third example of a socket

Turning attention to FIG. 3D, socket 355 configured to couple to a stuffing box with a hexagonal top seat, similar to the stuffing box 214, as shown in the middle and bottom drawings in FIG. 2B. Socket 355 is precision-tooled to couple with the top seat 216 of stuffing box 214. To achieve precision coupling to the top seat 216 of the stuffing box 214, socket 355 includes socket interior wall width 356 equal to 1.625 inches (with a tolerance of +0.005, −0.000), as measured across socket seating flats 357. This dimension of socket interior wall width 356 precisely couples with the top seat 216 of the stuffing box 214. In the example shown in FIG. 3D, six (6) top seating flats 357 configured in a hexagonal shape are shown on the socket interior wall 358 to correspond with the six top seating flats 218 of the top seat 216. Other numbers, sizes, and orientations of socket seating flats 357 may be used, depending on the manufacturer's design of the top seat 216.

For the example shown in FIG. 3D, drive socket 360 is a 0.500 inch square per ASA B5.38 and nut 361 includes a width across flats 362 equal to 1.500 inches (with a tolerance of +/−0.005), and an exterior flat angle 363 equal to 120.00° TYP (with a tolerance of +/−1°). Other sizes of drive socket 360 may be used to work with the corresponding size of ratchet wrench. For example, drive socket 360 may be a ¼ inch square, a ¾ inch square, or a ⅜ inch square.

The drawings in FIG. 3D are shown in a 1:1 scale. Additional dimensions of socket 355 may include socket outer ring 364=02.350, total socket height 365=2.69, socket base 366=1.69, socket top 367=1.00, socket top hole 368=0.206, socket stepped collar 369=R.06 TYP, center of hole to top of socket 370=0.309, interior socket body height 371=1.438, and interior socket top height 372=1.000. Unless otherwise specified, the preceding dimensions are in inches. The preceding dimensions may include the following tolerances: angular+/−1°, fractional+/−1⁄16, one place decimal+/−0.050, two place decimal+/−0.01, and three place decimal+/−0.005. Interpretations of the geometric tolerancing is per AMSE Y14.5.

In some examples, socket 355 is precision-tooled to couple with a bottom seat of the stuffing box 214 shown in FIG. 2A. The size, configuration, and number of socket seating flats 357 for a socket 355 precision-tooled for the bottom seat correspond to the size, configuration, and number of bottom seating flats of the bottom seat.

Additional sockets may be precision-tooled to fit different sizes of stuffing boxes and their components, such as a three (3) inch stuffing box. The advantages of using a socket precision-tooled to couple to a specific size of stuffing box and their components includes increased safety during the rebuild of the stuffing box. A precision coupling between the socket of the present invention and the stuffing box reduces the chances of the socket slipping or coming off the stuffing box during disassembly or reassembly of the stuffing box and may result in the rebuild failing due to the components not being able to be disassembled or reassembled. The precision-tooled sockets help to prevent injury to the user and damage to the stuffing box by achieving and maintain a precision couple with the stuffing box and its components. In addition, having a socket precision-tooled for a specific size of stuffing box decreases the number of tools needed for rebuilding the stuffing box. In conventional method for rebuilding stuffing boxes, multiple sizes of standard tools are needed to attempt to fit the stuffing box components. Many times no standard size tool is available to rebuild the stuffing box on site. This necessitates taking the stuffing box away from the work site to a location containing more options of standard tools. This creates a delay in rebuilding the stuffing box causing loss of production time and money due to the shutdown.

Figure 3E:
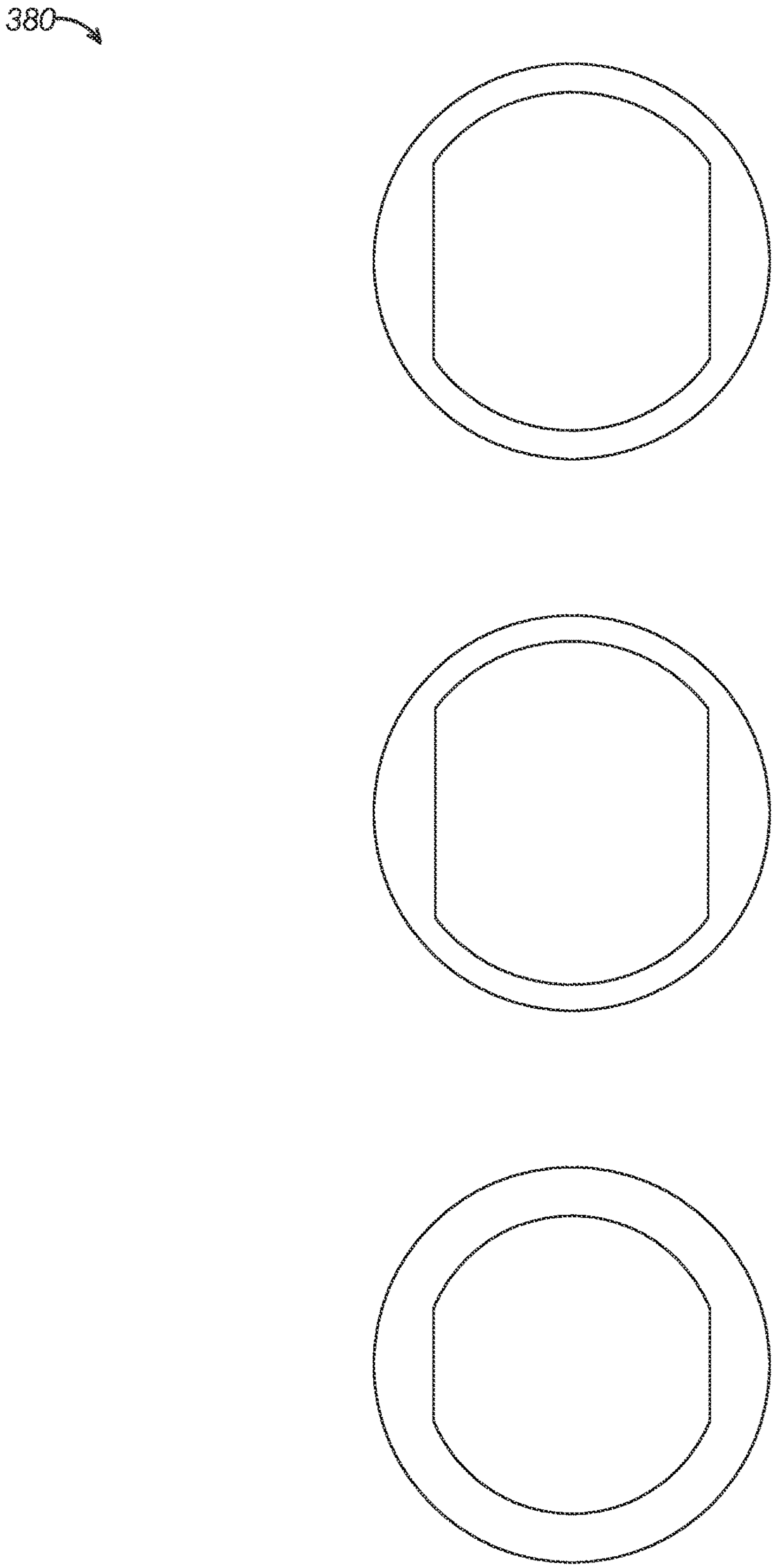
FIG. 3E is a set of top view of three socket rings.

Turning attention to FIG. 3E, one socket may be used for multiple sizes of stuffing boxes. The rings 380 may be inserted into the socket body and be fixed in place for use with the stuffing box corresponding to the ring size and seating flat configuration. The rings 380 shown in FIG. 3E are configured with two seating flats on opposite sides. Other configurations of the seating flats may be used, such as a hexagonal shape to couple with the hexagonal shape of the top seating flats as as shown in the middle and bottom drawings in FIG. 2B. Other sizes and shapes may be used to couple with other stuffing boxes.

Figure 5A:
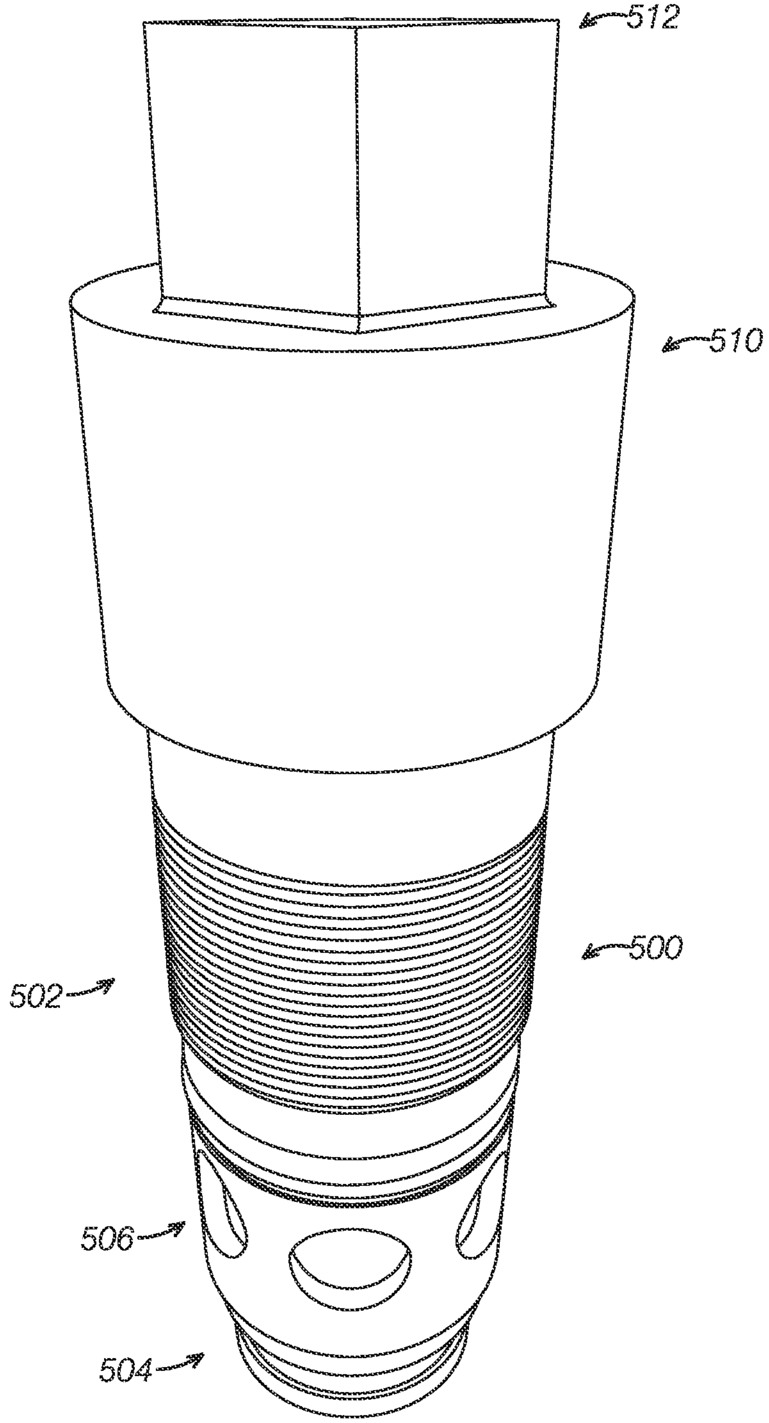
FIG. 5A is a perspective view of the socket shown in FIG. 3A connected to the top seat of the stuffing box shown in FIG. 2A.
Figure 5B:
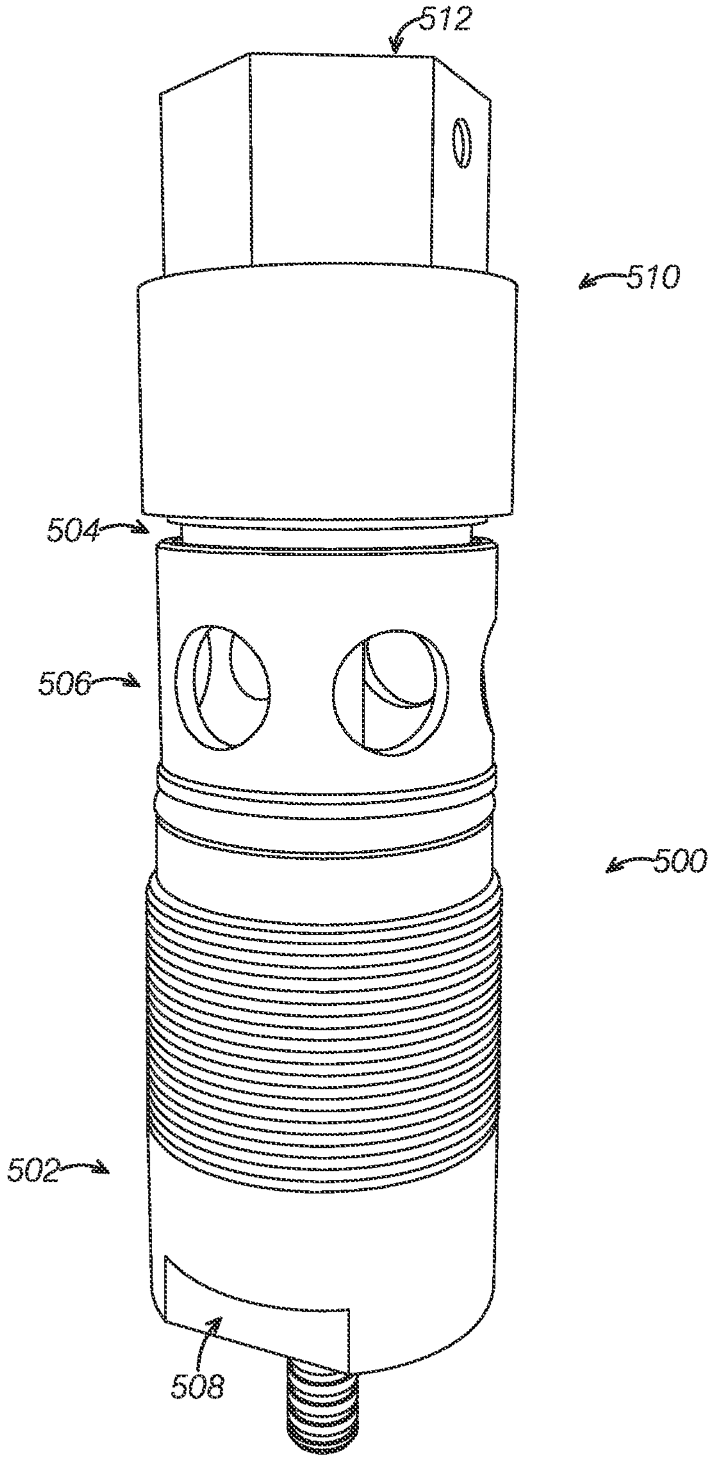
FIG. 5B is a perspective view of the socket shown in FIG. 3A connected to the bottom seat of the stuffing box shown in FIG. 2A.

FIGS. 5A and 5B illustrate use of a socket 510 similar to socket 300 on a stuffing box 500, similar to stuffing box 102, 202. In FIG. 5A, the socket 510 is coupled to the top seat 502 of the stuffing box 500. In this configuration, a wrench coupled to the socket top 512 may be used to rotate the socket 510 to remove the top seat 502 from the stuffing box 500 or replace the top seat 502 onto the stuffing box 500. In FIG. 5B, the socket 510 is coupled to the bottom seat 504 of the stuffing box 500. In this configuration, a wrench coupled to the socket top 512 may be used to rotate the socket 510 to remove the bottom seat 504 from the stuffing box 500 or replace the bottom seat 504 onto the stuffing box 500.

Wrenches

The wrenches of the present invention, such as those illustrated in FIG. 1 and FIGS. 4A-4D, are designed and precision-tooled to precisely couple with standard stuffing boxes, such as those illustrated in FIG. 1, FIG. 2A, and FIG. 2B. The wrenches may be comprised of a variety of materials, such as hardened steel, or other suitable material. In one embodiment, the wrenches are also able to be used with the sockets of the present invention, such as those illustrated in FIGS. 3A and 3B.

Wrenches illustrated in FIGS. 4A-4D are combination wrenches with one open end and one box-type end. Instead of conventional open-end sizes, the open end of the wrenches in FIGS. 4A-4D are precision-tooled to couple with the top seat or the bottom seat of a stuffing box. In one embodiment, the open end is also able to couple with the nut shaped socket top of the socket used for the stuffing box. Similarly, instead of standard sized box ends, which typically comprises a six, eight or twelve-point opening, the closed end of the wrenches is also precision-tooled to couple to the top seat and the bottom seat of the stuffing box. The open end of the wrench may also be used to remove the cage of the stuffing box.

In one example, the wrench is a hammer wrench. This configuration assists the user in removing components of the stuffing box, when the components, such as the top and bottom seats and the cage, are difficult to remove. In another example, the wrench has two closed or boxed ends to provide one tool for two different sizes of stuffing boxes or one end for the top seat and the one end for the bottom seat of the stuffing box. In another example, the wrenches have two open ends to provide one tool for two different sizes of stuffing boxes, or one end for the top seat and the one end for the bottom seat of the stuffing box.

Figure 4A:
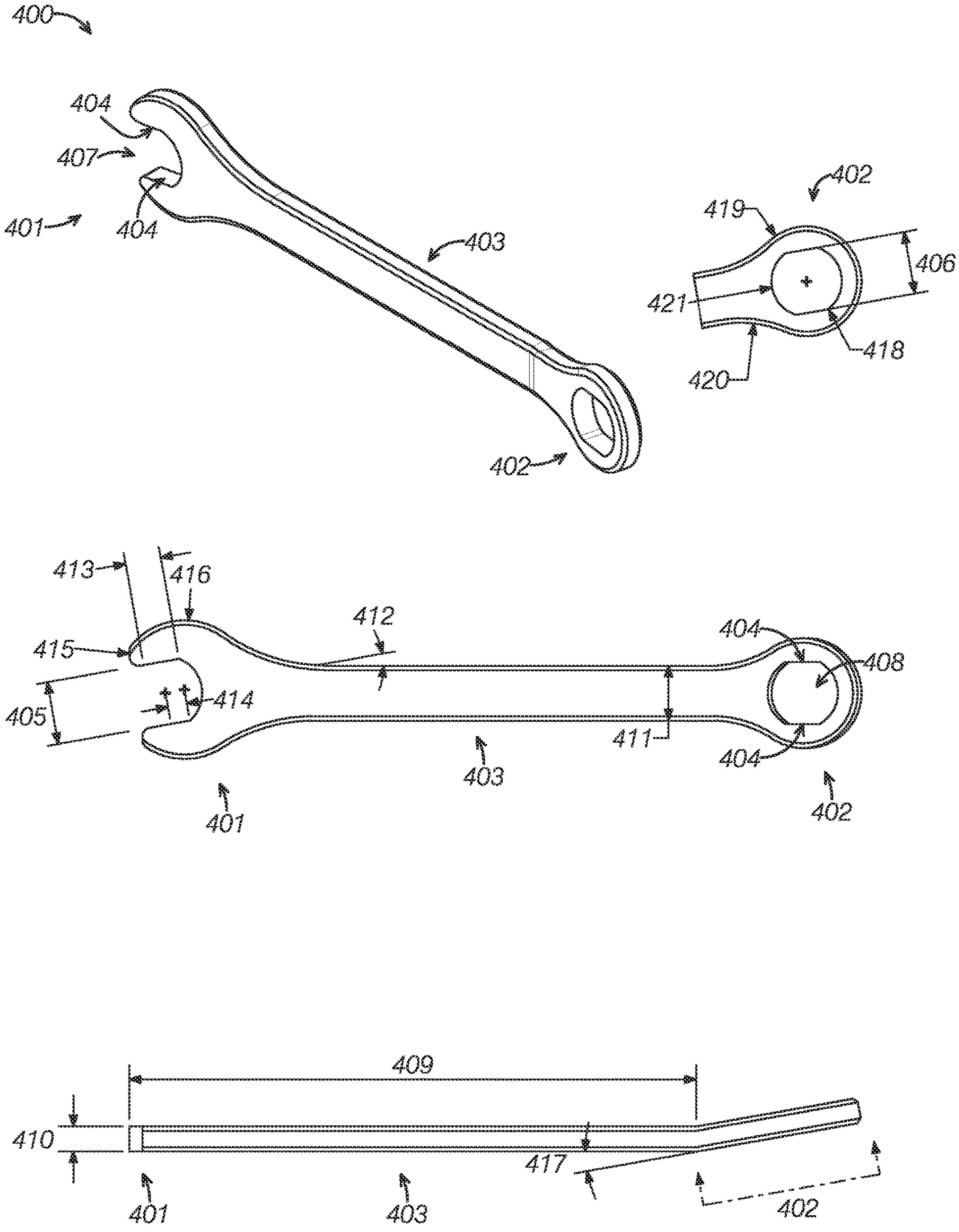
FIG. 4A is a set of perspective views of a first example of a wrench.

Turning attention to FIG. 4A, wrench 400 comprises an open end 401, a box end 402, and a middle section 403. Wrench 400 is configured to couple only to a one (1) inch stuffing box. The open end 401 and the box end 402 are precision-tooled to couple with a top seat of the one (1) inch stuffing box. Once the open end 401 or the box end 402 is coupled to the top seat, the wrench 400 facilitates the rotating of the top seat. In one example, the open end 401 and the box end 402 also precisely couple with the corresponding socket for the top seat of the one (1) inch stuffing box.

To achieve precision coupling to the one (1) inch stuffing box, the dimensions of wrench 400 include an open end opening width 405 equal to 1.002 inches (with a tolerance of +0.005 and −0.000) and a box end opening width 406 equal to 1.002 inches (with a tolerance of +0.005 and −0.000). The dimensions of opening widths 405, 406 precisely couple with the top seat of the one (1) inch stuffing box. In the example shown in FIG. 4A, two wrench seating flats 404 are shown on opposites sides of open end opening 407 and box end opening 408 to correspond with two top seating flats of the top seat, in a similar configuration as socket 314 as shown in FIG. 3B. In one example, the socket precision-tooled for the top seat of the one (1) inch stuffing box includes a top socket shape and size similar to the top seat to facilitate precision use of the wrench 400 for both the top seat and the socket when the socket is coupled to the top seat. Having one wrench 400 precision-tooled for both the one (1) inch stuffing box and the corresponding socket reduces the number of tools needed to rebuild the stuffing box. Other numbers, sizes, and orientations of wrench seating flats 404 may be used, depending on the manufacturer's design of the bottom seat.

The drawings in FIG. 4A are shown in a 1:2 scale. Additional dimensions of wrench 400 may include length of open end and middle 409=9.113, wrench thickness 410=0.375, wrench width 411=0.875, open end base angle 412=10.00°, first wrench seating flat length 413=0.56, second wrench seating flat length 414=0.305, open end tip 415=R.188, open end top 416=R1.100, box end base angle 417=10.00°, box end curve at seating flat 418=R.125 TYP, box end top 419=R.880, box end base 420=R2.00, and box end opening 421=R.567 (3×). Unless otherwise specified, the preceding dimensions are in inches. The preceding dimensions may include the following tolerances: angular+/−1°, fractional+/−1/16, one place decimal+/−0.050, two place decimal+/−0.010, and three place decimal+/−0.005. Interpretations of the geometric tolerancing is per AMSE Y14.5.

Figure 4B:
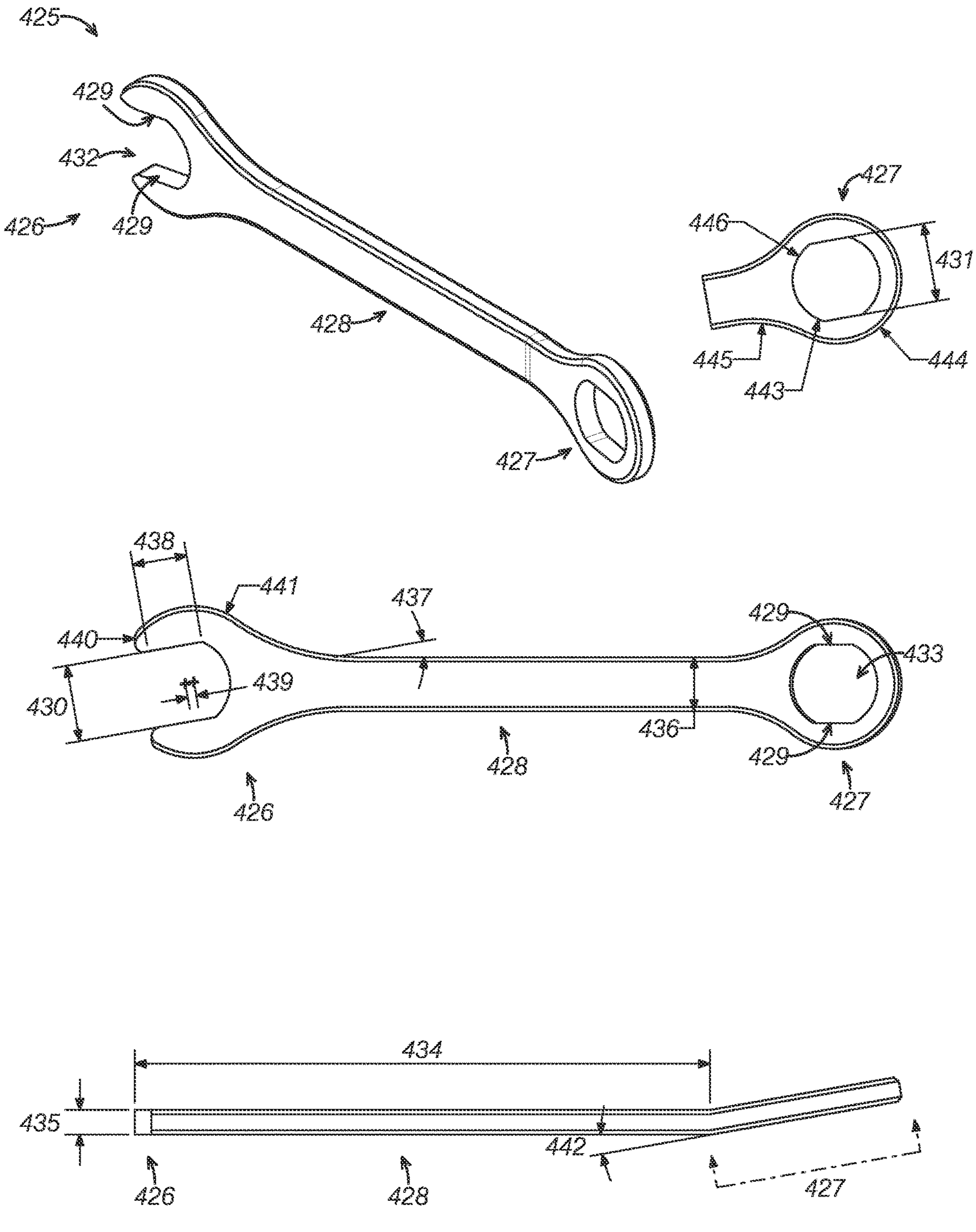
FIG. 4B is a set of perspective views of a second example of a wrench.

Turning attention to FIG. 4B, wrench 425 comprises an open end 426, a box end 427, and a middle section 428. Wrench 425 is configured to couple only to a one (1) inch stuffing box. The open end 426 and the box end 427 are precision-tooled to couple with a bottom seat of the one (1) inch stuffing box. Once the open end 426 or the box end 427 is coupled to the bottom seat, the wrench 425 facilitates the rotating of the bottom seat. In one example, the open end 426 and the box end 427 also precisely couple with the corresponding socket for the bottom seat of the one (1) inch stuffing box.

To achieve precision coupling to the one (1) inch stuffing box, the dimensions of wrench 425 include an open end opening width 430 equal to 1.190 inches (with a tolerance of +0.005 and −0.000) and a box end opening width 431 equal to 1.190 inches (with a tolerance of +0.005 and −0.000). The dimensions of opening widths 430, 431 precisely couple with the bottom seat of the one (1) inch stuffing box. In the example shown in FIG. 4B, two wrench seating flats 429 are shown on opposites sides of open end opening 432 and box end opening 433 to correspond with the two top seating flats of the bottom seat. In one example, the socket precision-tooled for the bottom seat of the one (1) inch stuffing box includes a top socket shape and size similar to the bottom seat to facilitate precision use of the wrench 425 for both the bottom seat and the socket when the socket is coupled to the bottom seat. Having one wrench 425 precision-tooled for both the one (1) inch stuffing box and the corresponding socket reduces the number of tools needed to rebuild the stuffing box. Other numbers, sizes, and orientations of wrench seating flats 429 may be used, depending on the manufacturer's design of the bottom seat.

The drawings in FIG. 4B are shown in a 1:2 scale. Additional dimensions of wrench 425 may include length of open end and middle 434=8.918, wrench thickness 435=0.375, wrench width 436=0.875, open end base angle 437=10.00°, first wrench seating flat length 438=0.845, second wrench seating flat length 439=0.102, open end tip 440=R.19, open end top 441=R1.18, box end base angle 442=10.00°, box end curve at seating flat 443=R.125 TYP, box end outer 444=R1.00, box end base 445=R2.0, and box end opening 446=R.687 (3×). Unless otherwise specified, the preceding dimensions are in inches. The preceding dimensions may include the following tolerances: angular+/−1°, fractional+/−1/16, one place decimal+/−0.050, two place decimal+/−0.010, and three place decimal+/−0.005. Interpretations of the geometric tolerancing is per AMSE Y14.5.

Figure 4C:
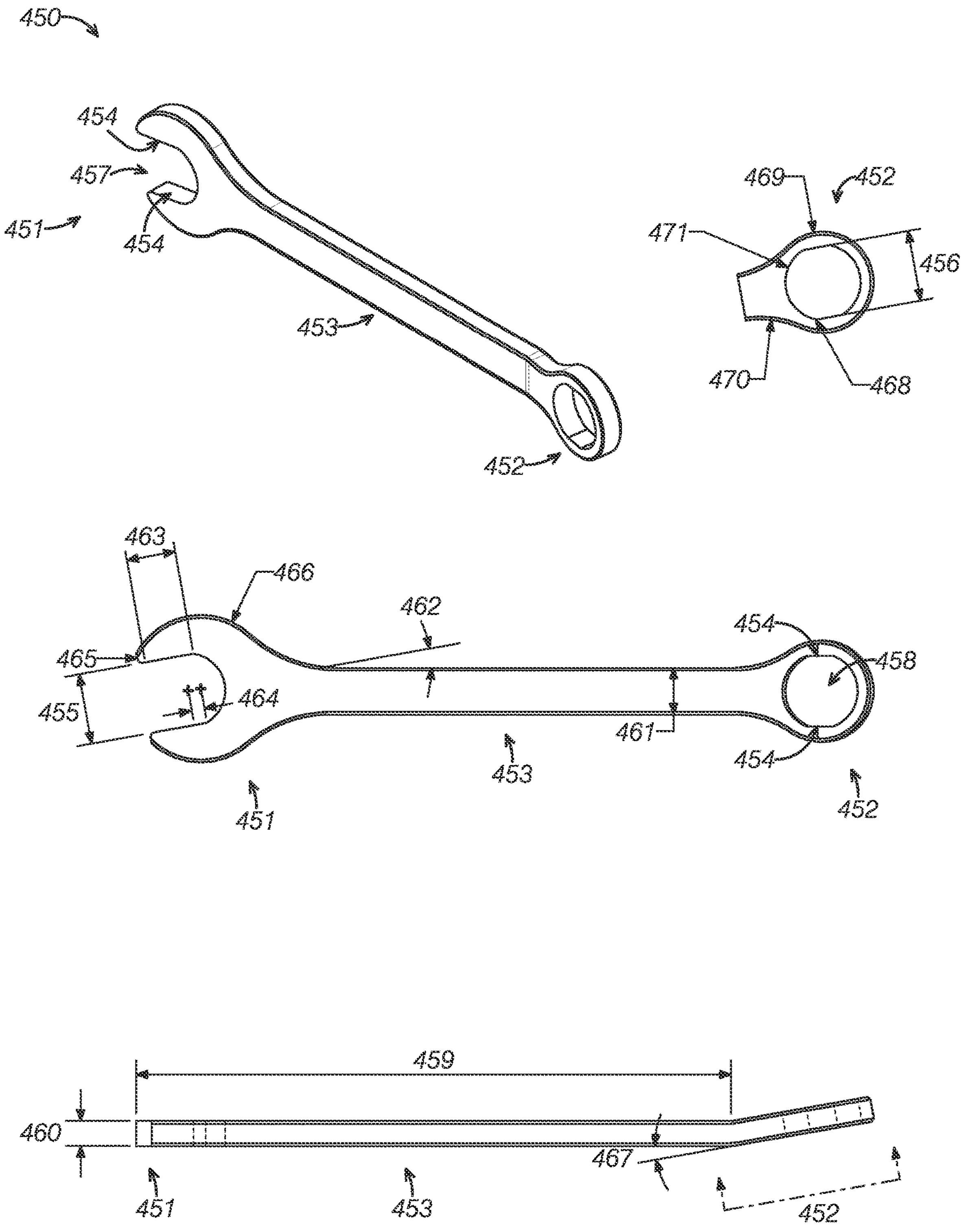
FIG. 4C is a set of perspective views of a third example of a wrench.

Turning attention to FIG. 4C, wrench 450 comprises an open end 451, a box end 452, and a middle section 453. Wrench 450 is configured to couple only to a two (2) inch stuffing box, similar to the stuffing box 202 shown in FIG. 2A. The open end 451 and the box end 452 are precision-tooled to couple with the top seat 204 of the stuffing box 202. Once the open end 451 or the box end 452 is coupled to the top seat 204, the wrench 450 facilitates the rotating of the top seat 204 with respect to the stuffing box 202. In one example, the open end 451 and the box end 452 also precisely couple with the corresponding socket 314 for the top seat 204 of the stuffing box 202.

To achieve precision coupling to the two (2) inch stuffing box 202, the dimensions of wrench 450 include an open end opening width 455 equal to 1.675 inches (with a tolerance of +0.005 and −0.000) and a box end opening width 456 equal to 1.675 inches (with a tolerance of +0.005 and −0.000). The dimensions of opening widths 455, 456 precisely couple with the top seat 204 of the stuffing box 202. In the example shown in FIG. 4D, two wrench seating flats 454 are shown on opposites sides of open end opening 457 and box end opening 458 to correspond with the two top seating flats 210 of the top seat 204. In one example, the socket 314 precision-tooled for the top seat 204 of the stuffing box 202 includes a top socket 318 shape 319 and size similar to the top seat 204 to facilitate precision use of the wrench 450 for both the top seat 204 and the socket 314 when the socket 314 is coupled to the top seat 204. Having one wrench 450 precision-tooled for both the stuffing box 202 and the corresponding socket 314 reduces the number of tools needed to rebuild the stuffing box.

Other numbers, sizes, and orientations of wrench seating flats 454 may be used, depending on the manufacturer's design of the top seat. One such example is stuffing box 214, as shown in the middle and bottom drawings in FIG. 2B, which includes six (6) top seating flats 218 in a hexagonal shape on the top seat 216. For this configuration of top seat 216, the corresponding wrench may comprise six (6) wrench seating flats in a corresponding hexagonal shape for the box end opening, precision-tooled to couple precisely with the hexagonal top seat 216. The wrench may also comprise a four (4), precision-tooled wrench seating flats for the open end that correspond to four sides of the hexagonal top seat 216. The open end of the wrench will couple with the hexagonal top seat 216 in a manner similar to a standard size wrench coupling to a corresponding standard size nut or bolt.

The drawings in FIG. 4C are shown in a 1:3 scale. Additional dimensions of wrench 450 may include length of open end and middle 459=14.075, wrench thickness 460=0.625, wrench width 461=1.125, open end base angle 462=10.00°, first wrench seating flat length 463=1.171, second wrench seating flat length 464=0.294, open end tip 465=R.19, open end top 466=R1.750, box end base angle 467=10.00°, box end curve at seating flat 468=R.13 TYP (4×), box end top 469=R1.20, box end base 470=R2.000, and box end opening 471=R.885 (4×). Unless otherwise specified, the preceding dimensions are in inches. The preceding dimensions may include the following tolerances: angular+/−1°, fractional+/−1⁄16, one place decimal+/−0.050, two place decimal+/−0.010, and three place decimal+/−0.005. Interpretations of the geometric tolerancing is per AMSE Y14.5.

Figure 4D:
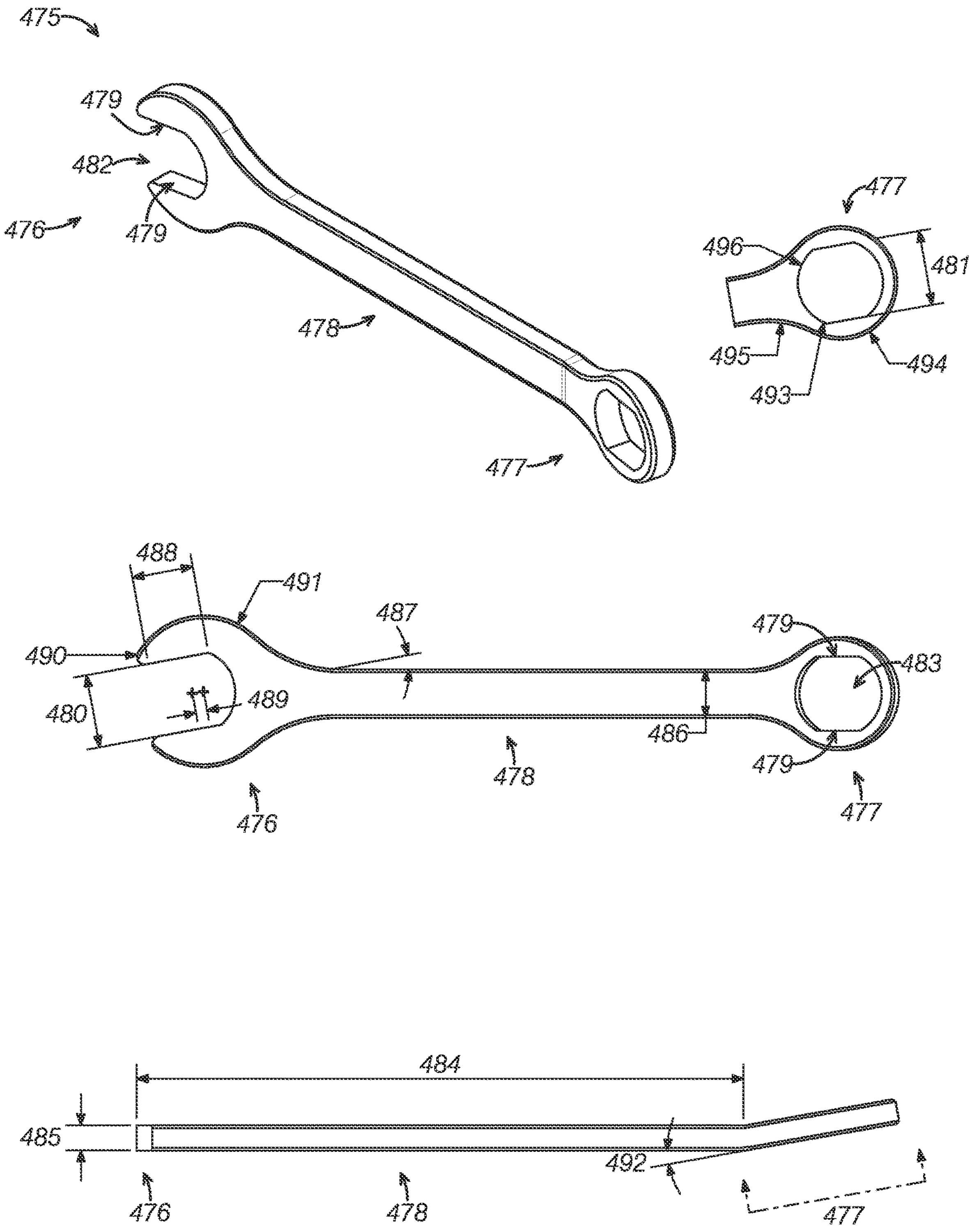
FIG. 4D is a set of perspective views of a fourth example of a wrench.

Turning attention to FIG. 4D, wrench 450 comprises an open end 451, a box end 452, and a middle section 453. Wrench 450 is configured to couple only to a two (2) inch stuffing box, similar to the stuffing box 202 shown in FIG. 2A. The open end 451 and the box end 452 are precision-tooled to couple with the top seat 204 of the stuffing box 202. Once the open end 451 or the box end 452 is coupled to the top seat 204, the wrench 450 facilitates the rotating of the top seat 204 with respect to the stuffing box 202. In one example, the open end 451 and the box end 452 also precisely couple with the corresponding socket 314 for the top seat 204 of the stuffing box 202.

To achieve precision coupling to the two (2) inch stuffing box 202, the dimensions of wrench 450 include an open end opening width 455 equal to 1.675 inches (with a tolerance of +0.005 and −0.000) and a box end opening width 456 equal to 1.675 inches (with a tolerance of +0.005 and −0.000). The dimensions of opening widths 455, 456 precisely couple with the top seat 204 of the stuffing box 202. In the example shown in FIG. 4D, two wrench seating flats 454 are shown on opposites sides of open end opening 457 and box end opening 458 to correspond with the two top seating flats 210 of the top seat 204. In one example, the socket 314 precision-tooled for the top seat 204 of the stuffing box 202 includes a top socket 318 shape 319 and size similar to the top seat 204 to facilitate precision use of the wrench 450 for both the top seat 204 and the socket 314 when the socket 314 is coupled to the top seat 204. Having one wrench 450 precision-tooled for both the stuffing box 202 and the corresponding socket 314 reduces the number of tools needed to rebuild the stuffing box.

Other numbers, sizes, and orientations of wrench seating flats 454 may be used, depending on the manufacturer's design of the top seat. One such example is stuffing box 214, as shown in the middle and bottom drawings in FIG. 2B, which includes six (6) top seating flats 218 in a hexagonal shape on the top seat 216. For this configuration of top seat 216, the corresponding wrench may comprise six (6) wrench seating flats in a corresponding hexagonal shape for the box end opening, precision-tooled to couple precisely with the hexagonal top seat 216. The wrench may also comprise a four (4), precision-tooled wrench seating flats for the open end that correspond to four sides of the hexagonal top seat 216. The open end of the wrench will couple with the hexagonal top seat 216 in a manner similar to a standard size wrench coupling to a corresponding standard size nut or bolt.

The drawings in FIG. 4D are shown in a 1:3 scale. Additional dimensions of wrench 450 may include length of open end and middle 484=13.99, wrench thickness 485=0.625, wrench width 486=1.125, open end base angle 487=10.00°, first wrench seating flat length 488=01.407, second wrench seating flat length 489=0.294, open end tip 490=R.19 (2×), open end top 491=R1.75, box end base angle 492=10.00°, box end curve at seating flat 493=R.125 TYP, box end top 494=R1.31, box end base 495=R2.0, and box end opening 496=R1.000 (3×). Unless otherwise specified, the preceding dimensions are in inches. The preceding dimensions may include the following tolerances: angular+/−1°, fractional+/−1⁄16, one place decimal+/−0.050, two place decimal+/−0.010, and three place decimal+/−0.005. Interpretations of the geometric tolerancing is per AMSE Y14.5.

Additional wrenches may be precision-tooled to fit different sizes of stuffing boxes and their components, such as a three (3) inch stuffing box. The advantages of using a wrench precision-tooled to couple to a specific size of stuffing box and their components includes increased safety during the rebuild of the stuffing box. A precision coupling between the wrench of the present invention and the stuffing box reduces the chances of the wrench slipping or coming off the stuffing box during disassembly or reassembly of the stuffing box and may result in the rebuild failing due to the components not being able to be disassembled or reassembled. The precision-tooled wrenches help to prevent injury to the user and damage to the stuffing box by achieving and maintain a precision couple with the stuffing box and its components. In addition, having a wrench precision-tooled for a specific size of stuffing box decreases the number of tools needed for rebuilding the stuffing box. In conventional method for rebuilding stuffing boxes, multiple sizes of standard tools are needed to attempt to fit the stuffing box components. Many times, no standard size tool is available to rebuild the stuffing box on site. This necessitates taking the stuffing box away from the work site to a location containing more options of standard tools. This creates a delay in rebuilding the stuffing box causing loss of production time and money due to the shutdown.

Figure 5C:
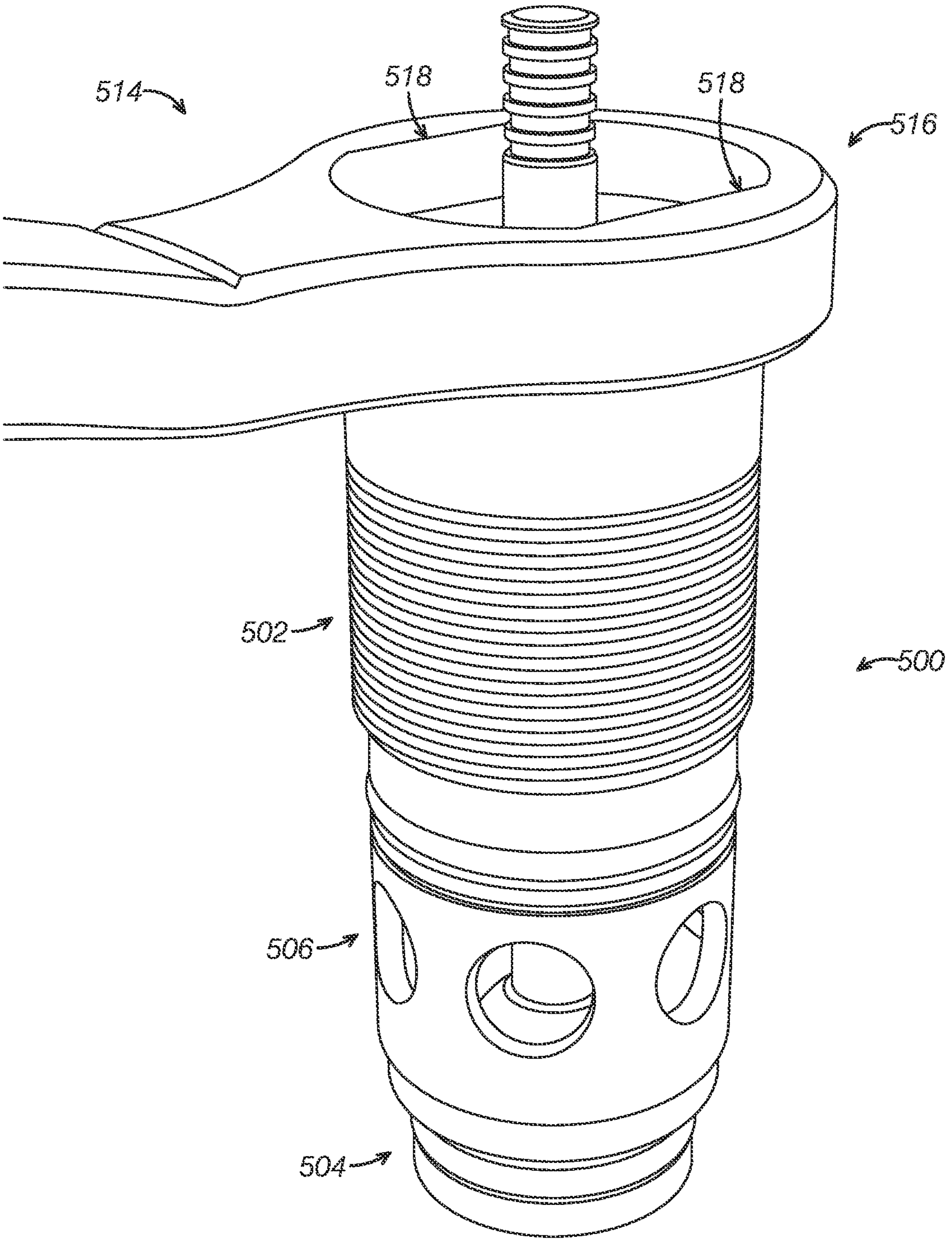
FIG. 5C is a perspective view of the wrench shown in FIG. 4C connected to the top seat of the stuffing box shown in FIG. 2A.

FIG. 5C illustrates the use of a wrench 514, similar to wrench 403, on a stuffing box 500, similar to stuffing box 102, 202. The wrench 514 is coupled to the top seat 502 of the stuffing box 500 to rotate the top seat 502 for removal from the stuffing box 500 or to replace the top seat 502 onto the stuffing box 500. The wrench 514 comprises two wrench seating flats 518 which are precision-tooled to fit the top seating flats 508 (as shown in FIG. 5B) of the top seat 502, as shown in FIG. 5C. The wrench 514 is rotated to remove the top seat 502 from the stuffing box 500 or to replace the top seat 502 onto the stuffing box 500.

Rebuild Table

In the example shown in FIG. 1, the rebuild table 114 is a workstation to assist the user for rebuilding the stuffing box 102. The rebuild table 114 includes a work surface 116 and a base 118. A first receptacle 120 and a second receptacle 122 are coupled to the rebuild table 114, and one or more clamps 124 are coupled to the second receptacle 122. The first receptacle 120 may be attached to a first location 130 of the rebuild table 114 and the second receptacle 122 may be attached to a second location 132 of the rebuild table 114. As shown in FIG. 1, the first location 130 and the second location 132 may be located on each end of the same side of the rebuild table 114. In some examples, the first location 130 and the second location 132 may be located on opposite corners of the rebuild table 114. The locations of the first receptacle 120 and the second receptacle 122 as shown in FIG. 1 allow for sufficient space on the work surface 116 for rebuilding the stuffing box 102 and as well as holding sockets, wrenches, and other items for rebuilding the stuffing box 102.

The first receptacle 120 is configured to receive and retain the stuffing box 102, 202 in an upside-down configuration such that the top seat 104, 204 is retained within the first receptacle 120. This allows for access to the bottom seat 206 for removal and replacement. The stuffing box 102, 202 may also be secured in the first receptacle 120 for removal of the cage 208. The first receptacle 120 may be an extension of the base 118, as shown in FIG. 1. The second receptacle 122 is configured to receive and retain the stuffing box 102, 202 for removal of the top seat 104, 204 and/or the cage 208.

Attached to the second receptacle 122 are the one or more clamps 124, which immobilize the cage 208 during removal of the top seat 104, 204. The one or more clamps 124 may be attached near a top of the second receptacle 122. Four clamps 124 are shown in FIG. 1, however fewer clamps or additional clamps may be used. As shown in FIG. 1, the one or more clamps 124 may be push-pull toggle clamps, but other types of clamps may be used.

Advantages of the first and second receptacles 120, 122 include having a dedicated, properly sized tool to receive and retain stuffing boxes. Conventional tools may not retain the stuffing box during rebuild, resulting in injury to the user or stuffing box if the tools slip or fly off of the stuffing box or its components or the tools retaining the stuffing box retain too forcefully causing damage to the stuffing box or its components. The first and second receptacles 120, 122 are sized properly to fit, for example, one (1) inch, two (2) inch, and three (3) inch stuffing boxes. Moreover, during the rebuild process, it is beneficial to have a place to retain components of the stuffing box. This prevents misplacing, losing, or damaging the stuffing box or its components by having a dedicated tool for retention.

The work surface 116 may be comprised of a variety of materials, such as wood, metal, plastic, or other sturdy materials. The work surface 116 may be configured as a tray, as shown in FIG. 1, to better contain items on the work surface 116 while using the stuffing box rebuild system 100.

In some examples, the work surface 116 is large enough to fit multiple first and second receptacles 120, 122 and still allow for sufficient space on the work surface 116 for rebuilding the stuffing box 102 and holding sockets, wrenches, and other items. An advantage of multiple first and second receptacles 120, 122 allows for multiple stuffing boxes 102 to be worked on simultaneously. It may be desirable to compare disassembled stuffing boxes, so having a space that not only allows for that process, but also to keep the components of each stuffing box separate as to not mix them up, misplace, or lose the components.

Figure 6:
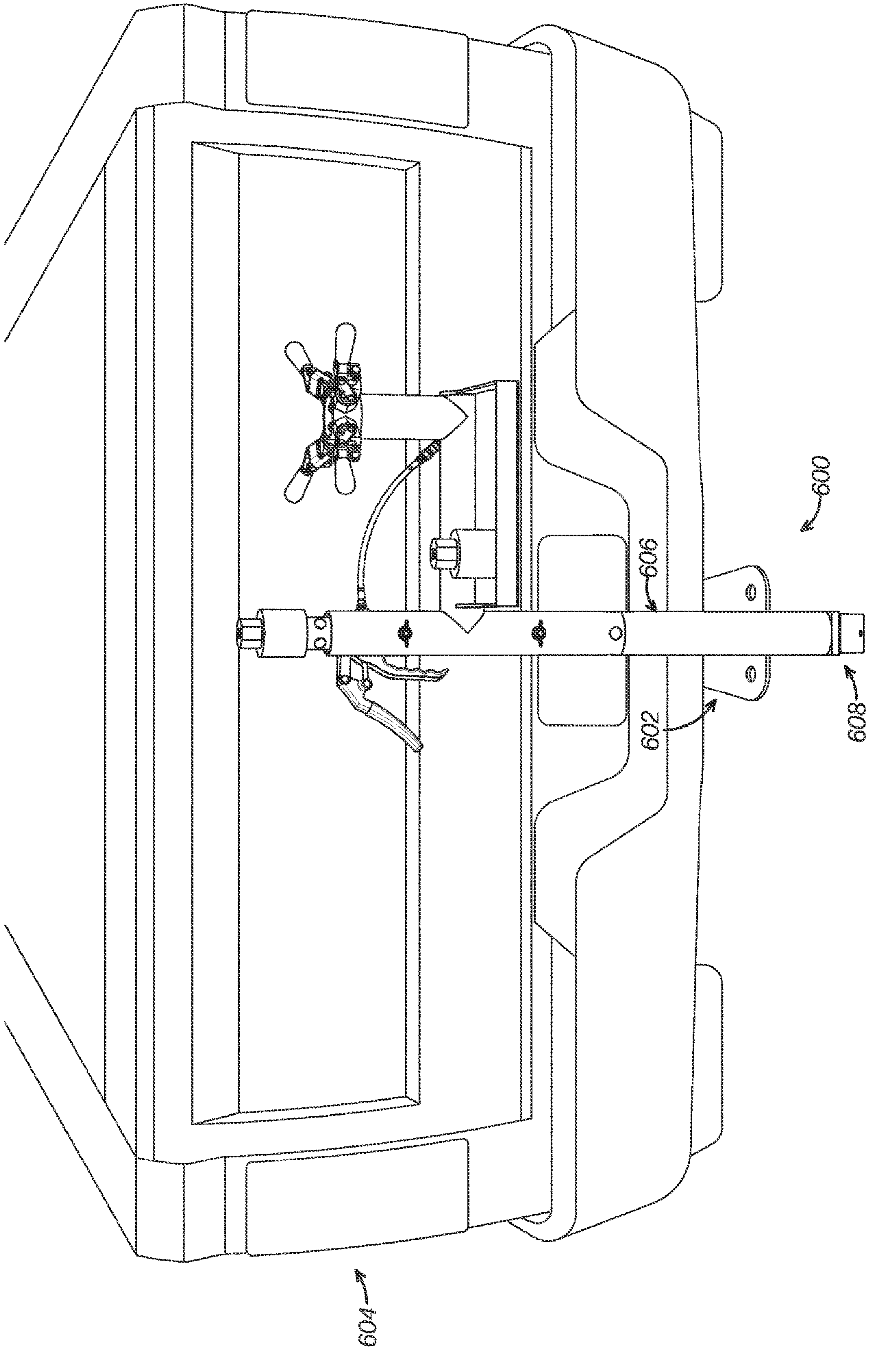
FIG. 6 is a perspective view of the rebuild table shown in FIG. 1.
Figure 7:
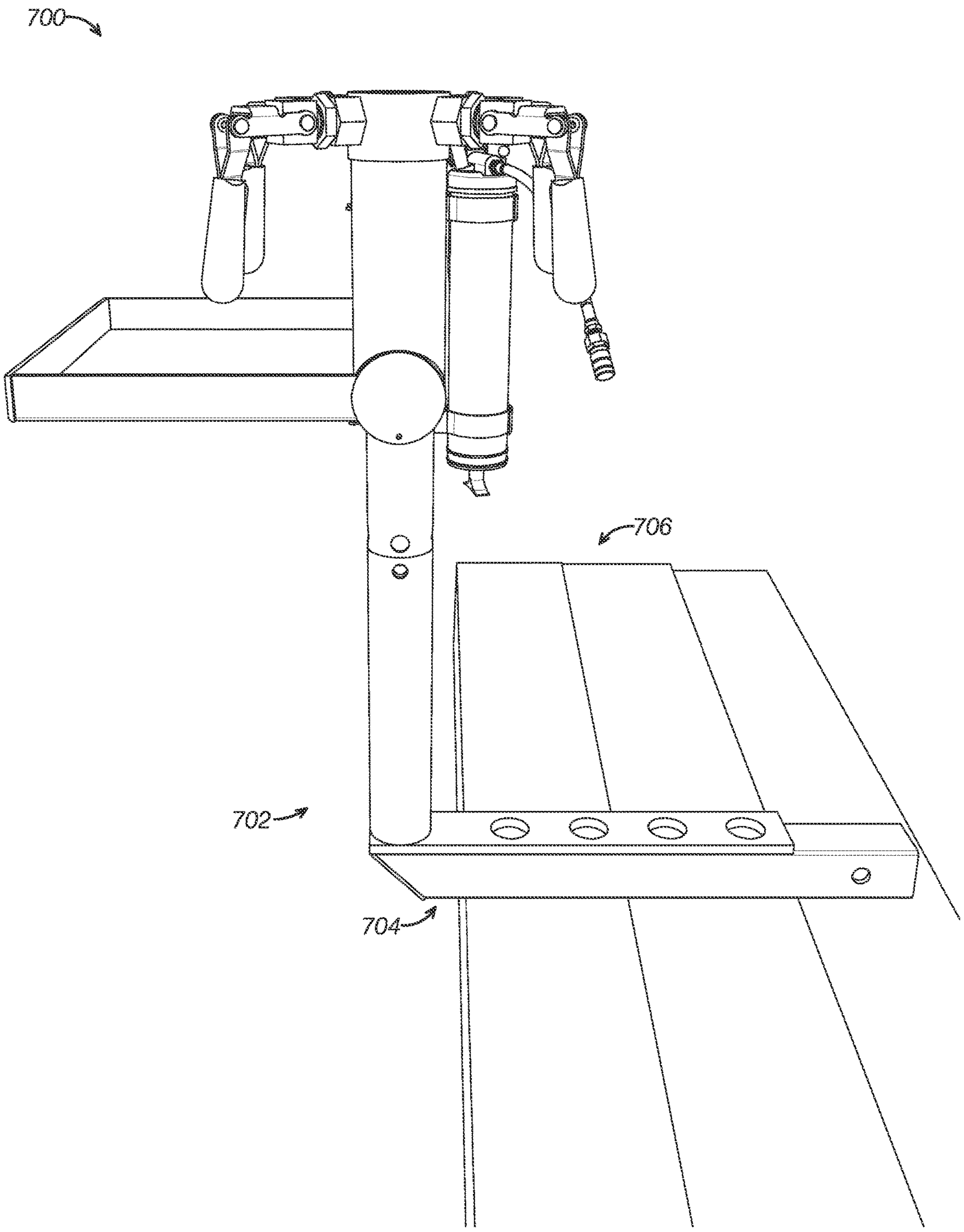
FIG. 7 is a perspective view of a second example of a rebuild table.

The base 118 supports the rebuild table 114. FIGS. 6 and 7 illustrate different embodiments of the base 118, however, other means to support and/or stabilize the rebuild table 114 may be used. As shown in FIG. 1, base 118 comprises a single support structure. In other embodiments, the base 118 may comprise multiple supports, such as a four legs at the bottom of the work surface 116 near each corner.

Having a portable rebuild table 114 is allows a user to rebuild the stuffing box 102 safely and quickly. The rebuild table 114 can be placed near the work site where the stuffing box 102 is located within its machinery, reducing the time for rebuild and thereby reducing the time the machinery is shut down saving time and money. An additional advantage of the rebuild table is having all the precision-tooled sockets and/or wrenches, and receptacles all in one place for the rebuild. This increases the time to rebuild the stuffing box and everything is in one place and all the tools and components will fit the stuffing box. Moreover, the rebuild table 114 keeps the stuffing box and its components contained reducing the chance of misplacing or losing the stuffing box or its components during rebuild.

Turning attention to FIG. 6, a rebuild table 600 is configured to couple to a vehicle hitch receiver 602 of a vehicle 604. This provides the advantage of transporting the rebuild table 600 to a work site using the vehicle 604, and then using the vehicle 604 and its vehicle hitch receiver 602 to set up and use the rebuild table 600. The base 606 of the rebuild table 600 is configured to be operatively received by the trailer hitch receiver 602. The trailer hitch receiver 602 may be a receiver-type trailer hitch, as shown in FIG. 6, or other types of trailer hitches, such as fixed ball mount.

Turning attention to FIG. 7, a rebuild table 700 is configured to be a stand-alone apparatus. The base 702 of the rebuild table 700 comprises one or more supports 704 and a platform 706, which may be made of wood, metal, plastic, or other sturdy material. In some examples, the rebuild table 700 does not include one or more features, such as the platform 706. In that embodiment, the one or more supports 704 make up the base 702 of the rebuild table 700. In some examples, a stand-alone base, as shown in FIG. 7 is interchangeable with a vehicle hitch base, as shown in FIG. 6, providing greater versatility for use of the rebuild table 600, 700. In some examples, the one or more supports 704 are height adjustable for use while standing, sitting, or to create a flat surface when the rebuild table 700 is on an uneven surface.

Figure 8:
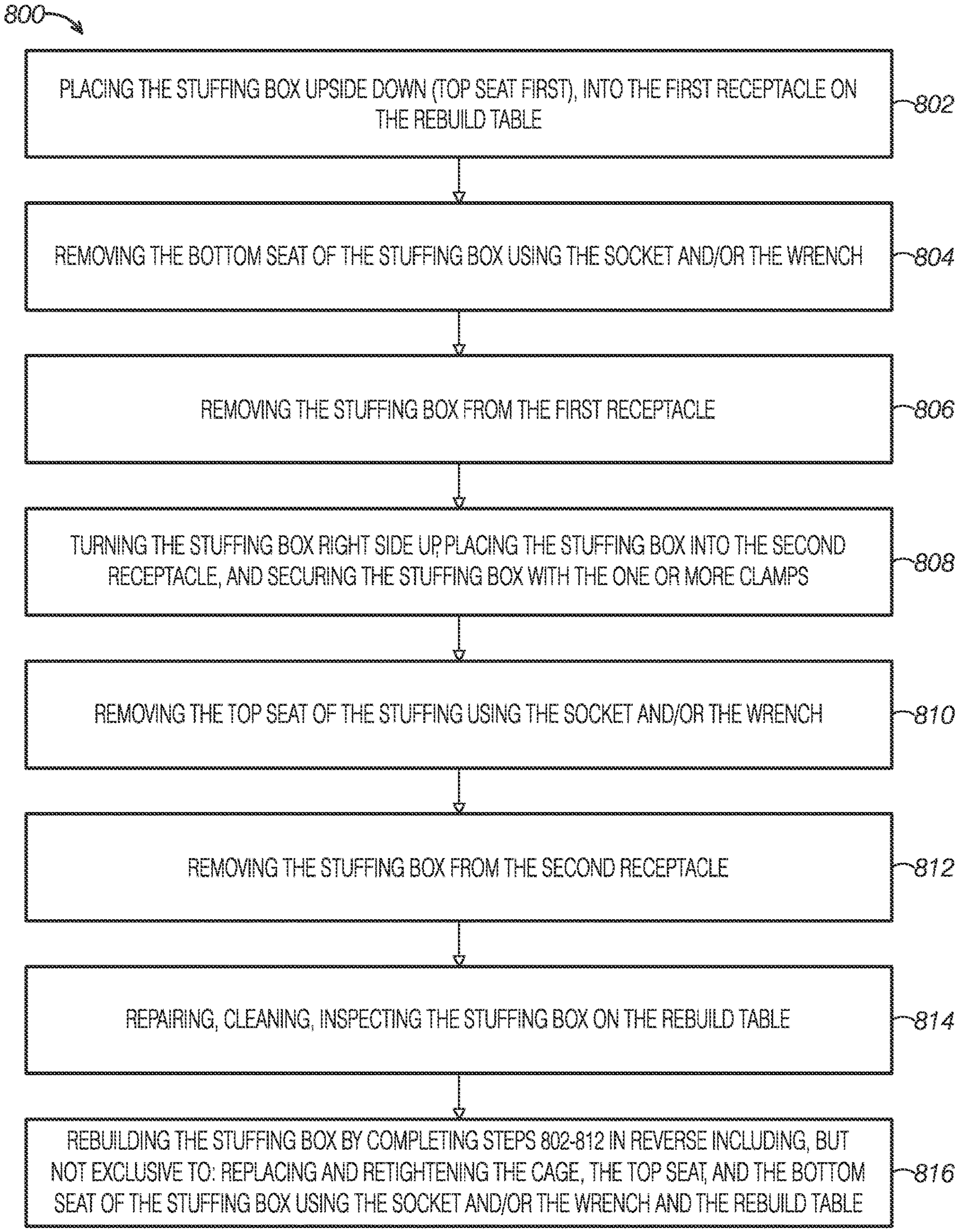
FIG. 8 is a method of using the stuffing box rebuild system shown in FIG. 1.

Turning attention to FIG. 8, a method 800 of using a stuffing box rebuild system will now be described. Method 800 includes placing the stuffing box 102, 202, upside down (top seat 104 first), into the first receptacle 120 on the rebuild table 114 (step 802). Other stuffing boxes may also be used with this method, such as one (1) inch and three (3) inch stuffing boxes. Step 804 includes removing the bottom seat 206 of the stuffing box 102, 202 using the socket 106 and/or the wrench 128. Other sockets and wrenches disclosed in the present application may also be used for removal of the bottom seat. Removing the cage 208 of the stuffing box 102, 202 using the socket 106 and/or the wrench 132 may also occur after step 804. Step 806 includes removing the stuffing box 102, 202 from the first receptacle 120. Step 808 includes turning the stuffing box 102, 202 right side up, placing the stuffing box 102, 202 into the second receptacle 122, and securing the stuffing box 102, 202 with the one or more clamps 124. Once the stuffing box is secured, step 810 includes removing the top seat 104, 204 of the stuffing box 102, 202 using the socket 106 and/or the wrench 128. Other sockets and wrenches disclosed in the present application may also be used for removal of the top seat. Removing the cage 208 of the stuffing box 102, 202 using the socket 106 and/or the wrench 132 may also occur after step 810. Step 812 includes removing the stuffing box 102, 202 from the second receptacle 124. Removing the cage 208 of the stuffing box 102, 202 using the socket 106 and/or the wrench 132 may also occur after step 812. Step 814 includes working on the stuffing box 102, 202, such as repairing, cleaning, and/or inspecting the stuffing box 102, 202 on the rebuild table 114. Other activities done to or with the stuffing box may also be done after step 814. Step 816 includes rebuilding the stuffing box 102, 202 by completing steps 802-812 in reverse including, but not exclusive to: replacing and retightening the cage 208, the top seat 104, 204, and the bottom seat 206 of the stuffing box 102, 202 using the socket 106 and/or the wrench 128. Method 800 references stuffing box 102, 202, but other stuffing may be used in method 800, such as one (1) inch and three (3) inch stuffing boxes and their corresponding precision-tool sockets and wrenches.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A stuffing box rebuild system, comprising:

a first socket and a second socket configured to couple to the stuffing box, wherein the first socket comprises:

a first socket top including a first leverage mechanism, and a first socket body comprising a first cavity and a first interior cavity wall, wherein the first interior wall includes one or more first socket seating flats, wherein the second socket comprises:

a second socket top including a second leverage mechanism, and a second socket body comprising a second cavity and a second interior cavity wall, wherein the second interior wall includes one or more second socket seating flats, wherein the stuffing box comprises a top seat, a bottom seat, and a cage, wherein the top seat includes one or more top seating flats, and wherein the bottom seat includes one or more bottom seating flats, wherein the first socket is precision-tooled to couple to the top seat of the stuffing box, wherein the one or more first socket seating flats are configured to couple to the one or more top seating flats for removal of the top seat from the stuffing box and for replacement back to the stuffing box, wherein the second socket is precision-tooled to couple to the bottom seat of the stuffing box, wherein the one or more second socket seating flats are configured to couple to the one or more bottom seating flats for removal of the bottom seat from the stuffing box and for replacement back to the stuffing box; and a rebuild table comprising:

a work surface comprising a top and a bottom, a base coupled to the bottom of the work surface, a first receptacle coupled to the work surface, wherein the first receptacle is configured to receive and retain the stuffing box for removal and replacement of the top seat and the cage, a second receptacle coupled to the work surface, wherein the second receptacle is configured to receive and retain the stuffing box for removal and replacement of the bottom seat and the cage, and one or more clamps coupled to the second receptacle to immobilize the stuffing box.

2. The stuffing box rebuild system of claim 1, wherein the first leverage mechanism comprises a first drive socket configured to couple with a first standard ratchet wrench, and wherein the second leverage mechanism comprises a second drive socket configured to couple with a second standard ratchet wrench.

3. The stuffing box rebuild system of claim 1, wherein the first leverage mechanism comprises a first nut socket top configured to couple with a first wrench precision-tooled to couple to the top seat, and wherein the second leverage mechanism comprises a second nut socket top configured to couple with a second wrench precision-tooled to couple to the bottom seat.

4. The stuffing box rebuild system of claim 1, wherein the first leverage mechanism comprises both a first drive socket configured to couple with a first standard ratchet wrench and a first nut socket top configured to couple with a first wrench precision-tooled to couple to the top seat, and wherein the second leverage mechanism comprises both a second drive socket configured to couple with a second standard ratchet wrench and a second nut socket top configured to couple with a second wrench precision-tooled to couple to the bottom seat.

5. The stuffing box rebuild system of claim 4, wherein the first standard ratchet wrench and the second standard ratchet wrench are the same wrench.

6. The stuffing box rebuild system of claim 1, wherein the rebuild table further includes a grease gun.

7. The stuffing box rebuild system of claim 1, wherein the base of the rebuild table includes a support, wherein the support couples to a vehicle hitch receiver.

8. The stuffing box rebuild system of claim 1, wherein the base of the rebuild table includes a support, wherein the support couples to an anchoring device.

9. The stuffing box rebuild system of claim 1, wherein the base of the rebuild table includes a support, wherein the support comprises one or more adjustable legs.

10. A stuffing box rebuild system, comprising:

a top wrench and a bottom wrench configured to couple to the stuffing box, wherein the top wrench comprises:

a first top end comprising one or more first top end wrench seating flats, and a second top end comprising one or more second top end wrench seating flats, wherein the bottom wrench comprises:

a first bottom end comprising one or more first bottom end wrench seating flats, and a second bottom end comprising one or more second bottom end wrench seating flats, wherein the stuffing box comprises a top seat, a bottom seat, and a cage, wherein the top seat includes one or more top seating flats, and wherein the bottom seat includes one or more bottom seating flats, wherein the top wrench is precision-tooled to couple to the top seat of the stuffing box, wherein the one or more first top end wrench seating flats are configured to couple to the one or more top seating flats for removal of the top seat from the stuffing box and for replacement back to the stuffing box, and wherein the one or more second top end wrench seating flats are configured to couple to the one or more top seating flats for removal of the top seat from the stuffing box and for replacement back to the stuffing box, and wherein the bottom wrench is precision-tooled to couple to the bottom seat of the stuffing box, wherein the one or more first bottom end wrench seating flats are configured to couple to the one or more bottom seating flats for removal of the bottom seat from the stuffing box and for replacement back to the stuffing box, and wherein the one or more second bottom end wrench seating flats are configured to couple to the one or more bottom seating flats of the bottom seat for removal of the bottom seat from the stuffing box and for replacement back to the stuffing box; and a rebuild table comprising:

a work surface comprising a top and a bottom, a base coupled to the bottom of the work surface, a first receptacle coupled to the work surface, wherein the first receptacle is configured to receive and retain the stuffing box for removal and replacement of the top seat and the cage, a second receptacle coupled to the work surface, wherein the second receptacle is configured to receive and retain the stuffing box for removal and replacement of the bottom seat and the cage, and one or more clamps coupled to the second receptacle to immobilize the stuffing box.

11. The stuffing box rebuild system of claim 10, wherein the first wrench comprises a combination wrench, wherein the first end is an open end and the second end is a box end, and wherein the second wrench comprises a combination wrench, wherein the second end is an open end and the second end is a box end.

12. The stuffing box rebuild system of claim 10, wherein the first open end and the first box end are precision-tooled for different sizes of stuffing box, and where second open end and the second box end are precision-tooled for different sizes of stuffing box.

13. The stuffing box rebuild system of claim 10, wherein the one or more wrenches are hammer wrenches.

14. The stuffing box rebuild system of claim 10, wherein the base of the rebuild table includes a support, wherein the support couples to a vehicle hitch receiver.

15. The stuffing box rebuild system of claim 10, wherein the base of the rebuild table includes a support, wherein the support couples to an anchoring device.

16. The stuffing box rebuild system of claim 10, wherein the base of the rebuild table includes a support, wherein the support comprises one or more adjustable legs.

17. A method comprising:

providing a stuffing box rebuild system, comprising:

a first socket and a second socket configured to couple to the stuffing box, wherein the first socket comprises:

a first socket top including a first leverage mechanism, and a first socket body comprising a first cavity and a first interior cavity wall, wherein the first interior wall includes one or more first socket seating flats, wherein the second socket comprises:

a second socket top including a second leverage mechanism, and a second socket body comprising a second cavity and a second interior cavity wall, wherein the second interior wall includes one or more second socket seating flats, wherein the stuffing box comprises a top seat, a bottom seat, and a cage, wherein the top seat includes one or more top seating flats, and wherein the bottom seat includes one or more bottom seating flats, wherein the first socket is precision-tooled to couple to the top seat of the stuffing box, wherein the one or more first socket seating flats are configured to couple to the one or more top seating flats for removal of the top seat from the stuffing box and for replacement back to the stuffing box, wherein the second socket is precision-tooled to couple to the bottom seat of the stuffing box, wherein the one or more second socket seating flats are configured to couple to the one or more bottom seating flats for removal of the bottom seat from the stuffing box and for replacement back to the stuffing box; and a rebuild table comprising:

a work surface comprising a top and a bottom, a base coupled to the bottom of the work surface, a first receptacle coupled to the work surface, wherein the first receptacle is configured to receive and retain the stuffing box for removal and replacement of the top seat and the cage, a second receptacle coupled to the work surface, wherein the second receptacle is configured to receive and retain the stuffing box for removal and replacement of the bottom seat and the cage, and one or more clamps coupled to the second receptacle to immobilize the stuffing box;

placing the stuffing box upside down into the first receptacle on the rebuild table, wherein the upside-down configuration includes the top seat being placed first into the first receptacle;

removing the bottom seat of the stuffing box using the first socket precision-tooled to couple to the bottom seat;

removing the stuffing box from the first receptacle;

turning the stuffing box right side up, placing the stuffing box into the second receptacle on the rebuild table;

securing the stuffing box with the one or more clamps;

removing the top seat of the stuffing box using the second socket precision-tooled to couple to the top seat;

removing the stuffing box from the second receptacle;

working on the stuffing box; and rebuilding the stuffing box.

18. The method of claim 17, further comprising removing the cage after removing the bottom seat.

19. The method of claim 17, further comprising removing the cage after removing the top seat.

20. The method of claim 17, wherein removing the bottom seat includes using a first wrench, wherein the first wrench is precision-tooled to couple to the bottom seat and the first socket; and wherein removing the top seat includes using a second wrench, wherein the second wrench is precision-tooled to couple to the top seat and the second socket.

* * * * *